(12) United States Patent
Kojima

(10) Patent No.: US 7,918,193 B2
(45) Date of Patent: Apr. 5, 2011

(54) COOLING DEVICE FOR VEHICLE

(75) Inventor: Toshihiko Kojima, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/656,009

(22) Filed: Jan. 13, 2010

(65) Prior Publication Data

US 2010/0116229 A1 May 13, 2010

Related U.S. Application Data

(62) Division of application No. 11/703,788, filed on Feb. 8, 2007, now Pat. No. 7,669,557.

(30) Foreign Application Priority Data

Feb. 8, 2006 (JP) .................................. 2006-031199
Mar. 22, 2006 (JP) .................................. 2006-079490
May 15, 2006 (JP) .................................. 2006-135485

(51) Int. Cl.
*F01P 1/00* (2006.01)

(52) U.S. Cl. ............... 123/41.04; 123/41.11; 123/41.49; 123/41.6; 123/41.65

(58) Field of Classification Search ............... 123/41.04, 123/41.11, 41.29, 41.3, 41.48, 41.49, 41.54, 123/41.56, 41.6, 41.62, 41.63, 41.65
See application file for complete search history.

(56) References Cited

U.S. PATENT DOCUMENTS

| 3,853,098 | A | | 12/1974 | Ishiwaka et al. |
| 3,872,842 | A | | 3/1975 | Medley |
| 4,156,408 | A | | 5/1979 | Protze |
| 4,164,262 | A | | 8/1979 | Skatsche et al. |
| 4,723,594 | A | * | 2/1988 | Koehr et al. ................ 165/44 |
| 5,046,550 | A | * | 9/1991 | Boll et al. .................. 165/41 |
| 5,313,978 | A | | 5/1994 | Takaki et al. |
| 5,660,149 | A | | 8/1997 | Lakerdas et al. |
| 5,758,716 | A | * | 6/1998 | Shibata ...................... 165/41 |
| 5,970,925 | A | * | 10/1999 | Lakerdas et al. ........ 123/41.11 |
| 6,106,228 | A | * | 8/2000 | Bartlett .................. 415/146 |
| 6,532,909 | B2 | * | 3/2003 | Stauder et al. .......... 123/41.04 |
| 6,668,956 | B1 | * | 12/2003 | Pelage et al. ............. 180/68.4 |
| 6,695,047 | B2 | * | 2/2004 | Brocksopp ............... 165/292 |

(Continued)

FOREIGN PATENT DOCUMENTS

DE 3345340 6/1985

(Continued)

OTHER PUBLICATIONS

Chinese Office Action, Nov. 28, 2008.

(Continued)

*Primary Examiner* — Hai H Huynh

(74) *Attorney, Agent, or Firm* — Finnegan, Henderson, Farabow, Garrett & Dunner, LLP

(57) ABSTRACT

A cooling device for a vehicle is provided at a vehicle comprising an engine control unit which stops an engine due to establishment of engine stoppage conditions and restarts the engine due to establishment of engine restart conditions. The cooling device for a vehicle is able to cool a coolant within a heat exchanger for cooling by cooling wind, which is guided from an exterior of the vehicle, passing through the heat exchanger for cooling. Cooling by driving force of either one of an electric motor or the engine can be selected in accordance with preset conditions.

6 Claims, 21 Drawing Sheets

U.S. PATENT DOCUMENTS

| | | | |
|---|---|---|---|
| 7,036,477 B1 | 5/2006 | Thompson et al. | |
| 7,603,968 B2 * | 10/2009 | Pantow | 123/41.04 |
| 2007/0119395 A1 * | 5/2007 | Nagano et al. | 123/41.65 |
| 2008/0017138 A1 * | 1/2008 | Rogg | 123/41.05 |
| 2009/0159021 A1 | 6/2009 | Kardos | |

FOREIGN PATENT DOCUMENTS

| | | |
|---|---|---|
| JP | 3-124911 | 5/1991 |
| JP | 06-211034 | 8/1994 |
| JP | 8-93473 | 4/1996 |
| JP | 9-156383 | 6/1997 |
| JP | 9-216559 | 8/1997 |
| JP | 2002-99627 | 4/2002 |
| JP | 2002-316529 | 10/2002 |
| JP | 2003-35173 | 2/2003 |
| JP | 2003-201882 | 7/2003 |
| JP | 2003-237384 | 8/2003 |
| JP | 2003-239741 | 8/2003 |
| JP | 2005-30363 | 2/2005 |
| JP | 2005-96684 | 4/2005 |
| JP | 2005-325805 | 11/2005 |

OTHER PUBLICATIONS

Technical publications of Toyota Jidosha Kabushiki Kaisha, "Cooling Device for Vehicle Engine," No. 13375 (Apr. 26, 2002).

Japan Inst. of Invention and Innovation Disclosed Technology, "Cooling Fan Device," Bulletin No. 2004-505064 (Aug. 2, 2004).

Japan Inst. of Invention and Innovation Disclosed Technology, Bulletin No. 2001-43 (Jan. 4, 2001).

Japanese Office Action dated Jul. 8, 2008.

* cited by examiner

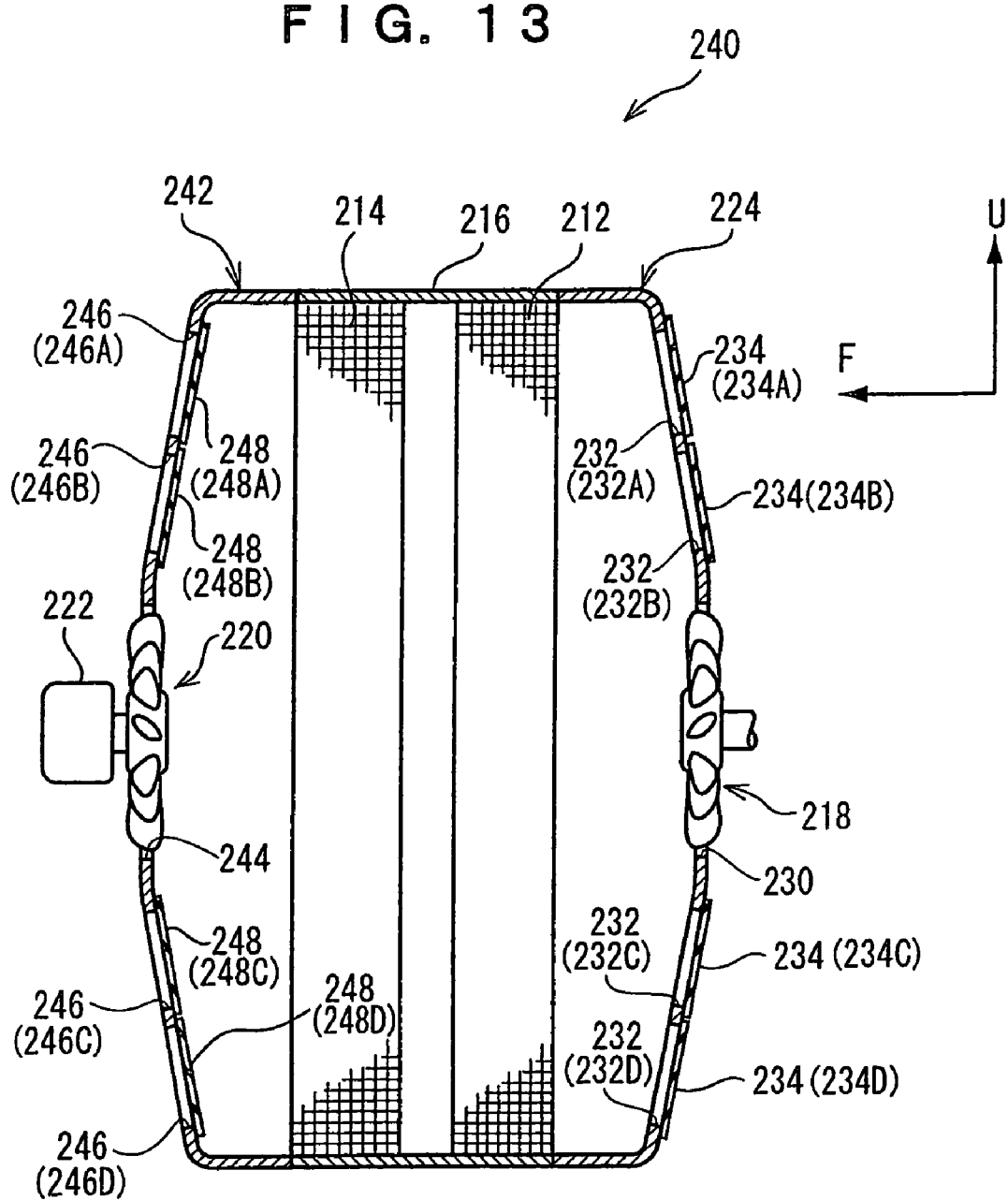

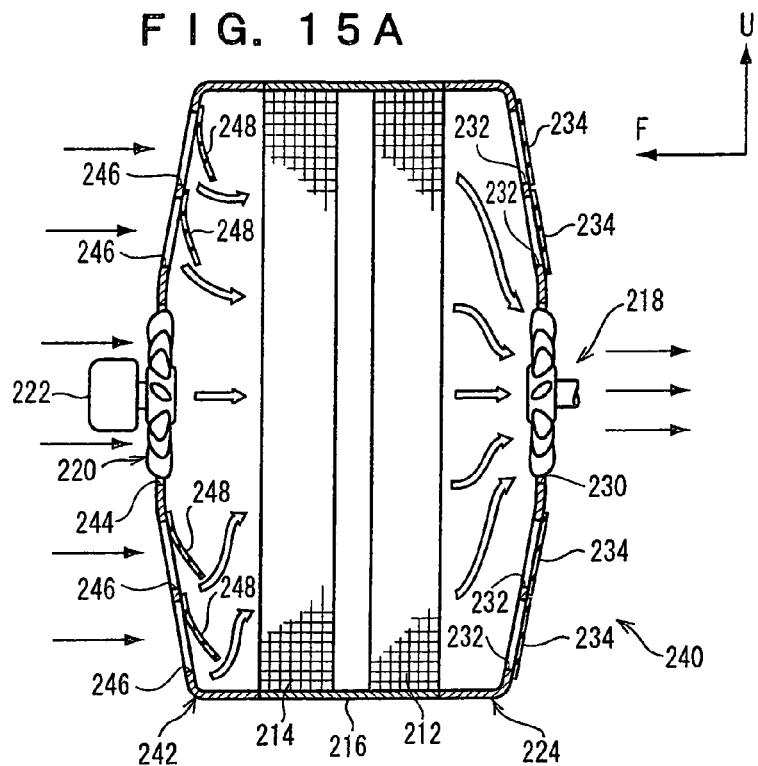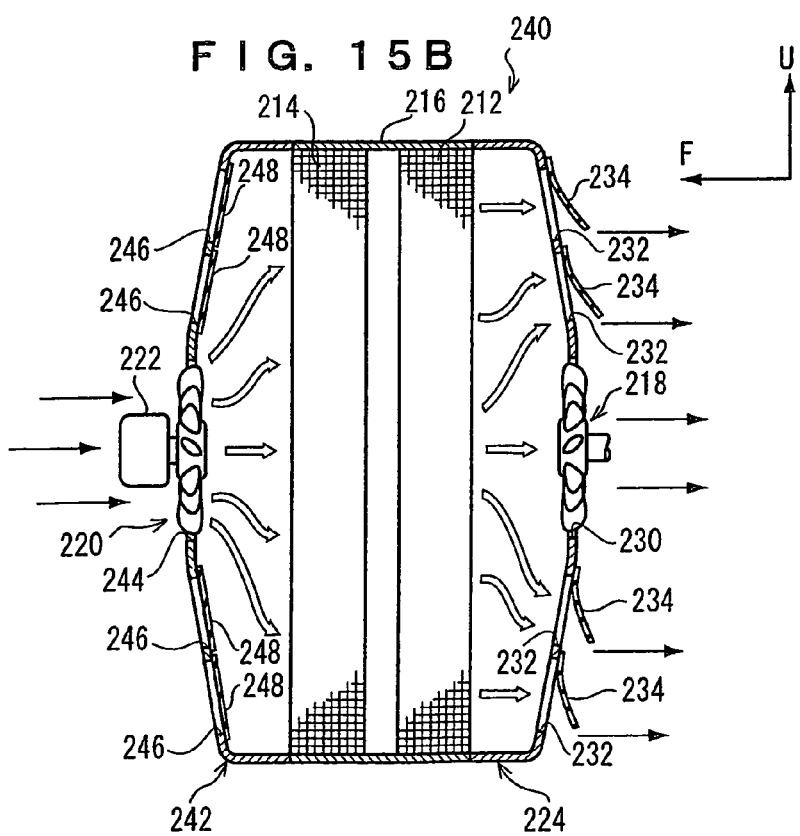

COOLING DEVICE FOR VEHICLE

CROSS-REFERENCE TO RELATED APPLICATION

This application is a division of application Ser. No. 11/703,788, filed Feb. 8, 2007, now U.S. Pat. No. 7,669,557 which claims priority under 35 U.S.C. 119 from Japanese Patent Applications No. 2006-031199, No. 2006-079490, and No. 2006-135485, the disclosures of which are incorporated by reference herein.

BACKGROUND OF THE INVENTION

1. Field of the Invention

The present invention relates to a cooling device for a vehicle which cools a coolant by using a heat exchanger for cooling such as an engine radiator, a condenser, or the like which is provided in a vehicle.

2. Description of the Related Art

A heat exchanger for cooling (hereinafter called heat exchanger), such as an engine radiator which is for cooling engine cooling water, or a condenser which is a heat exchanger for cooling of an air conditioning device for a vehicle (hereinafter called air conditioner), or the like, is provided in a vehicle, for example, within the engine room. Air at the vehicle front side is introduced in as cooling wind, and, due to the introduced cooling wind passing through the engine radiator or the condenser, the cooling water or the coolant for air conditioning is cooled.

In recent years, vehicles to which idling stop control, which stops the engine when the vehicle is stopped, is applied, and hybrid vehicles in which traveling by an electric motor in addition to the engine is possible, and the like have become popular for the purposes of increasing fuel efficiency and reducing emissions and noise.

In these vehicles, when predetermined engine stoppage conditions have been satisfied from the traveling speed, the driving-operating state, and the like, the engine driving is stopped, and when restoring conditions are satisfied, control which drives the stopped engine (hereinafter called economy running control) is carried out (see, for example, Japanese Patent Application Laid-Open (JP-A) No. 2003-201882).

By the way, the guiding of the cooling wind to the engine radiator is carried out by a mechanical fan. Due to the engine being stopped, the driving of the mechanical fan also is stopped, and a decrease in the cooling capacity of the engine radiator or the condenser, or the like, arises.

In order to suppress this, aforementioned JP-A No. 2003-201882 proposes, when the cooling water temperature rises, prohibiting engine stoppage, and preventing the temperature of the engine cooling water from rising. However, the effects which are obtained by economy running control deteriorate.

Further, JP-A No. 8-93473 proposes simultaneously driving a water pump, which circulates engine cooling water, and a cooling fan by using a single electric motor. By using this structure, even when the engine is stopped, the cooling fan is driven and cooling of the engine can be carried out.

Moreover, as a method of suppressing a lowering of the cooling efficiency of the engine radiator or the like in a state in which the engine is stopped while ensuring the effects obtained by economy running control, for example, JP-A No. 2002-316529 also is proposed. Here, there is proposed a method of providing an electric fan, which is driven by an electric motor, for cooling of the condenser.

Further, there is proposed, when the engine is stopped, driving an electric fan and exhausting the hot air which is within the engine room (see, for example, JP-A No. 2003-237384).

Moreover, there is proposed, when carrying out guiding of cooling wind by using only electric fans, driving two electric fans in stages in accordance with the rise in the traveling speed of the vehicle or the rise in the coolant pressure of the air conditioner (see, for example, JP-A No. 2005-30363).

In this way, using an electric fan has generally been thought of as a method for cooling plural heat exchangers, such as an engine radiator and a condenser and the like, while the engine is stopped.

Further, although not a technique relating to automatic idling stop control, there is disclosed a technique of providing a mechanical fan, which is driven by the engine, and an electric fan (see, for example, JP-A No. 9-156383).

In vehicles whose engine capacity is relatively small (e.g., up to about 1500 cc), because the cooling load of the engine radiator also is small, the desired cooling effect can be obtained at the time of automatic idling stopping even by an electric fan of an output of about 200 w to 300 w. However, in cases in which the engine capacity is large, such as a large vehicle or the like such as a truck or the like for example, the cooling load of the engine radiator also is large.

Therefore, in an automatic idling stop vehicle in which a large capacity engine is installed, if an attempt is made to ensure the cooling performance of a heat exchanger at the time when the engine is stopped by only an electric fan, the fan must be made to be large, and a fan motor fan of a large output (e.g., a motor whose about is 3 Kw or the like) is needed.

In order to provide such an electric fan, a large space is needed and the consumed electric power also becomes large (e.g., at 3 Kw, about 100 A at 46 v), and therefore, there is the problem that there is a large load on the battery as well.

Further, when a compact electric fan is used in addition to a mechanical fan, in order to simultaneously cool plural heat exchangers such as the engine radiator and the condenser and the like also at times when either of the two cooling fans is operated, there is the need to dispose them so as to be lined-up in the front-rear direction of the vehicle. This is difficult because a large space is needed in the engine room.

From this, a method has been thought of in which the driving of one cooling fan is switched between the engine and an electric motor, as shown in JP-A No. 2003-239741 for example. At this time, there is also a method of using an electric motor which is equipped with a fan coupling function shown in Hatsumei Kyokai Kokai Giho (Japanese Institute of Invention and Innovation Technology Bulletin) No. 2001-43 for example.

However, even if simply the driving of one cooling fan is possible by the engine and an electric motor respectively, appropriate switching control is needed in order to carry out efficient cooling.

Further, in a vehicle, a heat exchanger for cooling such as an engine radiator or a condenser for an air conditioner or the like is disposed at the front portion of the vehicle for example, and air is introduced in as cooling wind from openings of the front grill or the bumper grill or the like. Due to this cooling wind passing through the engine radiator or the condenser, heat exchange with the coolant is carried out.

Generally, a cooling fan (a mechanical fan such as a coupling fan or the like) which is driven by the driving force of the engine is provided in a vehicle, and, due to the engine being driven, the cooling fan sucks-in air, which is at the front in the direction of forward traveling of the vehicle (hereinafter called the front of the vehicle), into the engine room as cooling wind. In this way, an increased amount of cooling wind which passes through the engine radiator is devised, and accurate cooling of the cooling water which is the coolant is carried out.

A fan shroud is provided at the periphery of such a cooling fan, and heat within the engine room (engine compartment) is prevented from circling-in due to the cooling fan being driven and the cooling efficiency is prevented from decreasing.

Further, when a fan shroud is provided, if the hot air which is in the engine room circles-in to the vehicle front side of the engine radiator from gaps between a vehicle body structural portion and the fan shroud, the cooling efficiency by the cooling wind decreases. Here, there is proposed providing a projecting portion, which projects from the engine radiator further toward the vehicle front side, and suppressing the air within the engine room circling-in to the vehicle front side of the engine radiator (see, for example, JP-A No. 2005-96684).

In diesel engine vehicles or the like which move rearward at substantially the same frequency as moving forward, in a case in which a cooling fan is provided only for times of moving forward, the desired cooling efficiency cannot be obtained at times of moving rearward. Here, there has been proposed providing cooling fans, flappers for suction, and flappers for exhaust for each of the vehicle front side and rear side, so as to sandwich a central duct at which the radiator is provided (see, for example, JP-A No. 9-216559).

In this proposal, when the cooling fan for the rear side is operated while the vehicle is moving forward for example, due to negative pressure, the flapper for exhaust provided at the vehicle front side is closed and the flapper for suction is opened, and the flapper for exhaust provided at the vehicle rear side is opened and the flapper for suction is closed.

On the other hand, from standpoints such as improving fuel efficiency and environmental problems, it is preferable to stop the engine when traveling is stopped. At this time, a mechanical fan which is driven by the driving force of the engine also stops. Here, there is proposed providing an electric fan which operates for a given time period when the engine is stopped, and discharging-out the hot air which is within the engine room by this electric fan (see, for example, JP-A No. 2003-237384).

By the way, among vehicles, there is a so-called hybrid vehicle (HV) which is provided with an electric motor in addition to the engine as the drive sources for traveling, and the driving of the engine is stopped even while the vehicle is traveling.

Further, an air conditioner, which air-conditions the vehicle cabin interior, is provided in vehicles such as automobiles and the like. In HVs and the like, there are many cases in which the air conditioner is operated even when the engine is stopped. Therefore, cooling of the condenser is needed also when the engine is stopped.

Here, it has been thought to provide plural cooling fans such as, for example, a mechanical fan which is driven by the engine, and an electric fan or the like which can be driven even while the engine is stopped.

In this case, as shown in FIG. 16, a structure has been thought of in which, when heat exchangers for cooling 300 such as an engine radiator and a condenser or the like are cooled, plural cooling fans 302, 304 such as a mechanical fan and an electric fan or the like are disposed so as to be lined-up, for example, along a direction (the transverse direction of the vehicle) orthogonal to the front-rear direction of the vehicle, and are covered by one fan shroud 306.

However, openings 308, 310 in which the cooling fans 302, 304 are disposed are formed in the fan shroud 306. When, for example, only the cooling fan 304 is operated, the air within the engine room enters-in from the opening 308 of the cooling fan 302 (between the blades of the cooling fan 302 and the fan shroud 306). There is the problem that, regardless of the fact that the cooling fan 304 is being operated, conversely, the cooling efficiencies of the heat exchangers for cooling 300 are lowered.

Further, in order to prevent this, the cooling fan 302 and the cooling fan 304 are covered by separate fan shrouds. There is the problem that the regions which can be cooled by the respective cooling fans 302, 304 are narrowed, and the desired cooling efficiency cannot be obtained.

SUMMARY OF THE INVENTION

In view of the aforementioned, the present invention provides a cooling device for a vehicle.

A first aspect of the present invention is a cooling device for a vehicle provided at a vehicle including an engine control unit which stops an engine due to establishment of engine stoppage conditions and restarts the engine due to establishment of engine restart conditions, the cooling device able to cool a coolant within a heat exchanger for cooling by cooling wind, which is guided from an exterior of the vehicle, passing through the heat exchanger for cooling, the cooling device including: a first cooling fan driven by driving force of the engine, and guiding the cooling wind to the heat exchanger for cooling; a second cooling fan driven by an electric motor, and guiding the cooling wind to the heat exchanger for cooling; a selecting unit which can select either one of the first cooling fan or the second cooling fan on the basis of preset conditions and stopping/starting of the engine; and a cooling control unit driving the selected cooling fan when the first or second cooling fan is selected by the selecting unit.

A second aspect of the present invention is a cooling device for a vehicle provided at a vehicle at which engine control is carried out which stops an engine due to establishment of preset engine stoppage conditions and restarts the engine due to establishment of engine start conditions, the cooling device including: a heat exchanger for cooling at which heat exchange with a coolant is carried out due to cooling wind being guided; a single cooling fan which, by being rotated and driven, operates and guides the cooling wind to the heat exchanger for cooling; a first driving unit able to operate the cooling fan by driving force of the engine; a second driving unit able to operate the cooling fan by driving force of an electric motor; a detecting unit detecting a cooling load on the heat exchanger for cooling; a judging unit judging a cooling capacity of the heat exchanger for cooling on the basis of results of detection of the detecting unit; and a cooling control unit which, on the basis of results of judgment of the judging unit and a guiding capacity of the cooling wind, selects either one of the first driving unit or the second driving unit and operates the cooling fan.

BRIEF DESCRIPTION OF THE DRAWINGS

Preferred embodiments of the present invention will be described in detail based on the following figures, wherein:

FIG. 13 is a schematic structural drawing showing a guiding structure relating to a fifth embodiment.

FIG. 15A is a schematic drawing showing the flow of cooling wind at a time when one cooling fan is driven, and FIG. 15B is a schematic drawing showing the flow of cooling wind at a time when another cooling fan is driven.

DETAILED DESCRIPTION OF THE INVENTION

First through third embodiments of the present invention will be described hereinafter with reference to the drawings.

First Embodiment

Figure 1:
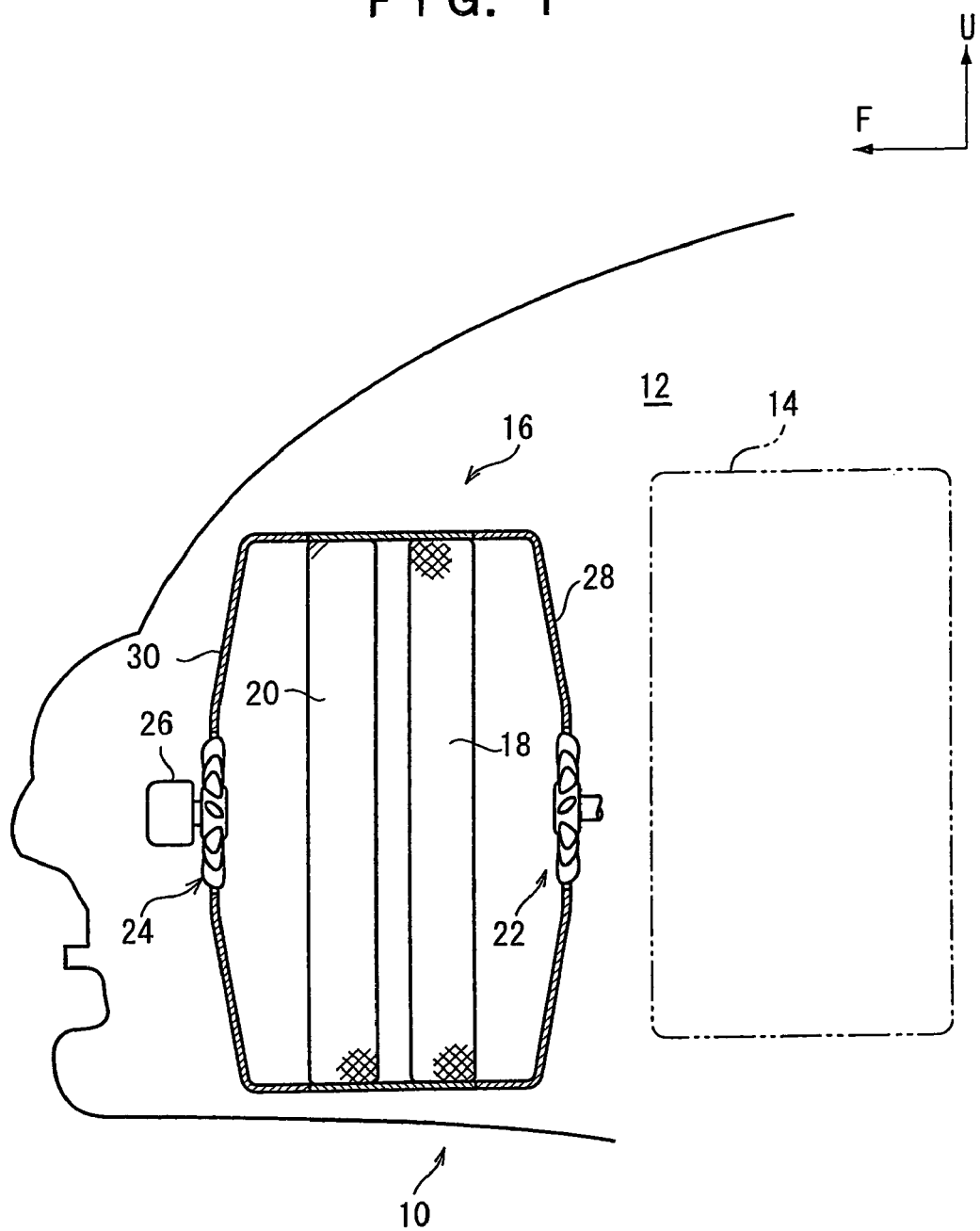
FIG. 1 is a schematic drawing of main portions of a vehicle relating to a first embodiment.

The schematic structure of the front portion of a vehicle 10, which is applied to a first embodiment of the present invention, is shown in FIG. 1. Note that, in FIG. 1, the front side in the front-rear direction of the vehicle is shown as the direction of arrow F and the upper side in the top-bottom direction of the vehicle is shown as the direction of arrow U, and the direction orthogonal to the direction of arrow F and the direction of arrow U respectively is the vehicle transverse direction.

An engine 14 is disposed within an engine room 12 of the front portion of the vehicle 10. Further, a cooling device 16 is disposed at the vehicle front side of the engine 14, within the engine room 12 of the vehicle 10.

The cooling device 16 includes, as heat exchangers for cooling, an engine radiator 18, at which engine cooling water is circulated between the engine 14 and the engine radiator 18, and a condenser 20, which forms a refrigeration cycle of an unillustrated air conditioning device (air conditioner) and in which coolant for air conditioning is circulated. The engine cooling water is circulated between the engine 14.

In the cooling device 16, the engine radiator 18 is disposed at the engine 14 side, and the condenser 20 is disposed adjacent at the vehicle front side of the engine radiator 18.

A front bumper grill (not shown) is provided at the front end portion of the vehicle 10. Air at the vehicle front side can be guided into the engine room 12 from the front bumper grill. In the cooling device 16, this air is the cooling wind, and the cooling wind passes through the condenser 20 and the engine radiator 18. In this way, cooling of the coolant, which is circulated in the refrigeration cycle, and the engine cooling water is carried out.

On the other hand, at the cooling device 16, a cooling fan 22 is provided as a first cooling fan at the vehicle rear side of the engine radiator 18 (between the engine 14 and the engine radiator 18). The cooling fan 22 is connected to the unillustrated crank shaft of the engine 14, and is rotated and driven by the driving force of the engine 14 (hereinafter, this is called the mechanical fan 22). At the cooling device 16, air at the vehicle front side is guided as cooling wind due to the mechanical fan 22 being rotated and driven.

Further, at the cooling device 16, a cooling fan 24 which is a second cooling fan is provided at the vehicle front side of the condenser 20. This cooling fan 24 (hereinafter called electric fan 24) is connected to a fan motor 26 serving as a drive source. Due to the fan motor 26 operating, air at the vehicle front side is pushed-in toward the condenser 20 as cooling wind.

A fan shroud 28, which covers the space between the engine radiator 18 and the mechanical fan 22, is provided at the cooling device 16. The fan shroud 28 can send the cooling wind, which has passed through the engine radiator 18, out toward the vehicle rear side, and prevents the air within the engine room 12 from entering-in between the engine radiator 18 and the mechanical fan 22.

Further, a fan shroud 30, which covers the space between the condenser 20 and the electric fan 24, is provided at the cooling device 16. The fan shroud 30 can guide the air at the vehicle front side as cooling wind, and prevents the air within the engine room 12 from entering-in between the condenser 20 and the electric fan 24.

Note that a known, general structure in which is formed a ring-shaped opening, in which the mechanical fan 22 or the electric fan 24 is disposed and through which the cooling wind can pass, can be applied to the fan shrouds 28, 30.

In this way, at the cooling device 16, air at the vehicle front side can be guided as cooling wind due to either one of the mechanical fan 22 or the electric fan 24 being driven, or vehicle 20 traveling.

Further, in the cooling device 16, a compact electric motor, whose output (rated output) is 200 w to 300 w, is used as the fan motor 26. In this way, at the cooling device 16, at times when the mechanical fan 22 is driven, the guided amount of cooling wind is greater and a greater cooling capacity is obtained than at times when the electric fan 24 is driven.

Figure 2:
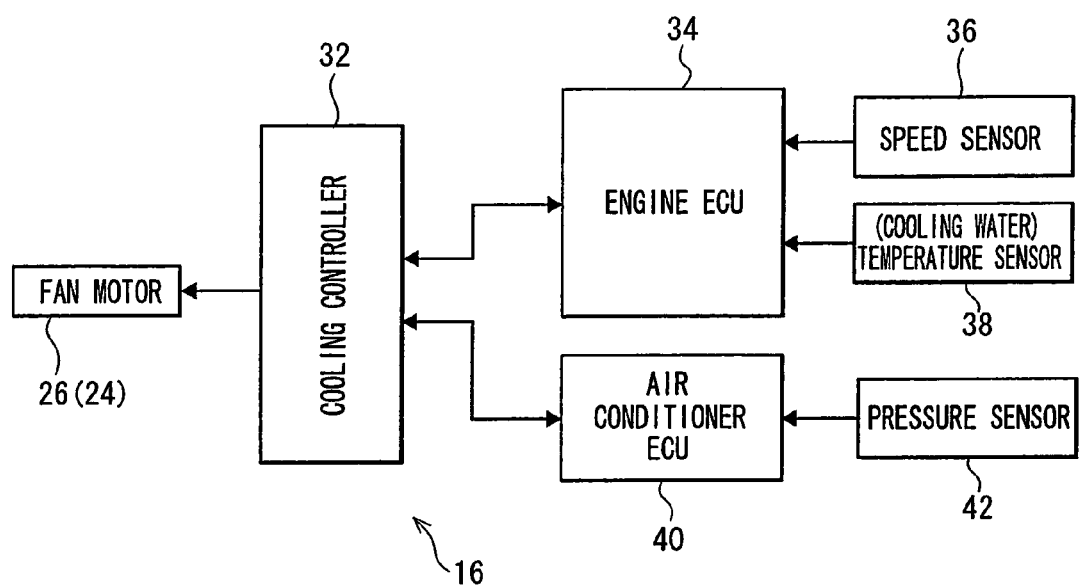
FIG. 2 is a block diagram of main portions including a cooling device relating to the first embodiment.

As shown in FIG. 2, a cooling controller 32 is provided as a cooling control unit at the cooling device 16. The fan motor 26 is connected to the cooling controller 32, and the driving of the electric fan 24 is controlled by the cooling controller 32.

On the other hand, the vehicle 10 is a so-called hybrid vehicle in which an unillustrated electric motor is provided in addition to the engine 14 as the drive sources for traveling. In this way, at the vehicle 10, when predetermined traveling conditions are satisfied and engine stoppage conditions are established, driving of the engine 14 is stopped. Improvement in fuel efficiency, and the like, are possible. Further, at the vehicle 10, when preset restart conditions of the engine 14 are satisfied and engine restart conditions are established, the engine 14 which is stopped is restarted, and traveling using the driving force of the engine 14 is possible.

An engine ECU 34, which is an engine control unit which controls the starting and stopping of the engine 14 (see FIG. 1), and a hybrid ECU (not shown), which controls the operation of the electric motor for traveling and the like, are provided at the vehicle 10. At the vehicle 10, driving control at the time of traveling, and the like, are carried out by the engine ECU 34 and the hybrid ECU.

At this time, at the engine ECU 34. the traveling state of the vehicle 10 and the driving-operating state by the driver are detected by various types of sensors or the like, and, when the results of detection satisfy preset engine stoppage conditions, the engine 14 is stopped, and when they satisfy engine restart conditions, restarting of the engine 14 is carried out.

In this way, at the engine ECU 34, for example, when it is detected by a vehicle speed sensor 36 that the traveling speed of the vehicle 10 (the vehicle speed) has become "0", it is judged that the vehicle 10 is stopped, and the engine 14 is stopped (idle stop control). In this way, an improvement in fuel efficiency, suppression of emissions, and the like are achieved.

Further, a temperature sensor 38, which detects the cooling water temperature of the engine 14, is provided at the vehicle 10. The temperature sensor 38 is connected to the engine ECU 34. In this way, sensing of the cooling water temperature of the engine 14 is possible at the engine ECU 34.

Note that known structures and controlling methods can be applied to the structure and the control of the engine ECU 34 including such a hybrid ECU, and detailed description thereof is omitted here. Further, in the present embodiment, explanation is given by using a so-called hybrid vehicle as an example, but the present invention is not limited to this, and can be applied to a vehicle of an arbitrary structure such as an idling stop vehicle at which engine stoppage conditions and engine restart conditions are set and which carries out stopping and restarting of the engine 14 on the basis of the set conditions, or the like.

On the other hand, an air conditioner ECU 40 for controlling the operation of the air conditioner is provided at the vehicle 10. On the basis of the set temperature, the amount of solar radiation, the cabin interior temperature, the outside air temperature, and the like, the air conditioner ECU 40 controls the temperature and the blown amount of the air conditioned wind which is blown-out into the vehicle cabin such that the vehicle cabin interior becomes a set temperature. At this time, at the air conditioner ECU 40, coolant is sent-into the condenser 20 while being compressed by an unillustrated compressor, and this coolant is compressed and liquefied at the condenser 20. At this time, heat exchange is carried out with the cooling wind which passes through the condenser 20. The air conditioner ECU 40 has such a general structure.

In such an air conditioner, a pressure sensor 42 is provided, and the pressure sensor 42 is connected to the air conditioner ECU 40. In this way, at the air conditioner ECU 40, it can be confirmed whether or not the condenser 20 is carrying out cooling of the coolant at a predetermined cooling capacity and the desired air-cooling capacity is being obtained. Note that conventionally known structures can be applied to the basic structures of this air conditioner and air conditioner ECU 40, and therefore, detailed description thereof is omitted here.

By the way, the cooling controller 32 is connected to the engine ECU 34 and the air conditioner ECU 40. In this way, the engine ECU 34 can detect whether or not the engine 14 is in a stopped state, i.e., if the engine stoppage conditions are established and the engine 14 is stopped, or, whether or not the restart conditions of the engine 14 are established and the engine 14 is restarted.

On the other hand, when the engine 14 is stopped, the cooling controller 32 carries out control of the cooling capacities of the engine radiator 18 and the condenser 20.

At this time, the cooling controller 32 is such that the engine ECU 34 reads-in the traveling speed of the vehicle 10 detected by the vehicle speed sensor 36, and the air conditioner ECU 40 carries out reading-in of the coolant pressure detected by the pressure sensor 42.

At the cooling device 16, due to the vehicle 10 being in the midst of traveling, air at the vehicle front side passes through the fan shroud 30 and is guided as cooling wind, even in the state in which the mechanical fan 22 and the electric fan 24 are stopped. Due to the traveling speed of the vehicle 10 becoming higher, the guided amount of the cooling wind also increases.

Here, at the cooling controller 32, when the traveling speed of the vehicle 10 acquired via the engine ECU 34 exceeds a preset speed (a set speed, e.g., about 20 Km/h to 30 km/h), it is judged that a predetermined cooling capacity is being obtained by the engine radiator 18 and the condenser 20, without going so far as to drive the mechanical fan 22 and the electric fan 24.

Note that this set speed may be set on the basis of the cooling capacities of the engine radiator 18 and the condenser 20 with respect to the traveling speed, and the cooling loads on the engine radiator 18 and the condenser 20, and the like.

In contrast, if the traveling speed of the vehicle 10 has not reached the set speed, there is the possibility that the cooling capacities of the engine radiator 18 and the condenser 20, and, in particular, the cooling capacity of the condenser 20 at times when the air conditioner is being operated and air conditioning of the vehicle cabin interior is being carried out, are insufficient.

Here, the cooling controller 32 reads-in, from the air conditioner ECU 40, the coolant pressure detected by the pressure sensor 42, and, from this coolant pressure, judges whether or not the cooling load on the condenser 20 exceeds the cooling capacity of the condenser 20.

Namely, at the air conditioner, the air-cooling load (heat load) on the air-cooling capacity of the condenser 20 increases. Here, at the cooling controller 32, when the coolant pressure exceeds a preset pressure (a set value), the cooling load has become large with respect to the cooling capacity of the condenser 20, and therefore, it is judged that the need to increase the cooling capacity of the condenser 20 has arisen.

When it is judged, from the coolant pressure of the condenser 20, that the need to increase the cooling capacity has arisen, the cooling controller 32 aims to increase the cooling capacity by operating the electric fan 24. Further, when the electric fan 24 is being operated, if an increase in the cooling capacity becomes necessary, the cooling controller 32 selects the mechanical fan 22 instead of the electric fan 24, stops the electric fan 24, and carries out an engine 14 start request to the engine ECU 34.

In this way, due to the engine 14, which the engine ECU 34 stopped, being started, the mechanical fan 22 is driven, and an increase in the cooling capacities of the condenser 20 and the engine radiator 18 is devised.

Operation of the first embodiment will be described hereinafter.

At the vehicle 10 at which the cooling device 16 is provided, the engine stoppage conditions and engine restart conditions are set in advance at the engine ECU 34. When the engine stoppage conditions are established from the vehicle traveling state or the driving-operating state, the engine ECU 34 stops the engine 14. Further, in a state in which the engine ECU 34 is stopping the engine 14, if the engine restart conditions are established, the engine ECU 34 carries out restarting of the engine 14 and carries out traveling using the driving force of the engine 14 (economy running control).

By the way, at the vehicle 10, due to the engine 14 being driven, the mechanical fan 22 is driven by the driving force of the engine 14, and cooling of the engine cooling water by the engine radiator 18, and cooling of the coolant of the air conditioner by the condenser 20, are carried out. However, due to the engine 14 stopping, the driving of the mechanical fan 22 stops and the cooling efficiency decreases.

In this way, for example, when air conditioning of the vehicle cabin interior by using the air conditioner is being carried out, there are cases in which the vehicle cabin interior can no longer be maintained in the desired air conditioned state and the vehicle occupants are made to feel discomfort.

Here, at the cooling device 16, when the engine 14 is stopped, efficient and accurate cooling of the condenser 20 is possible.

Figure 3:
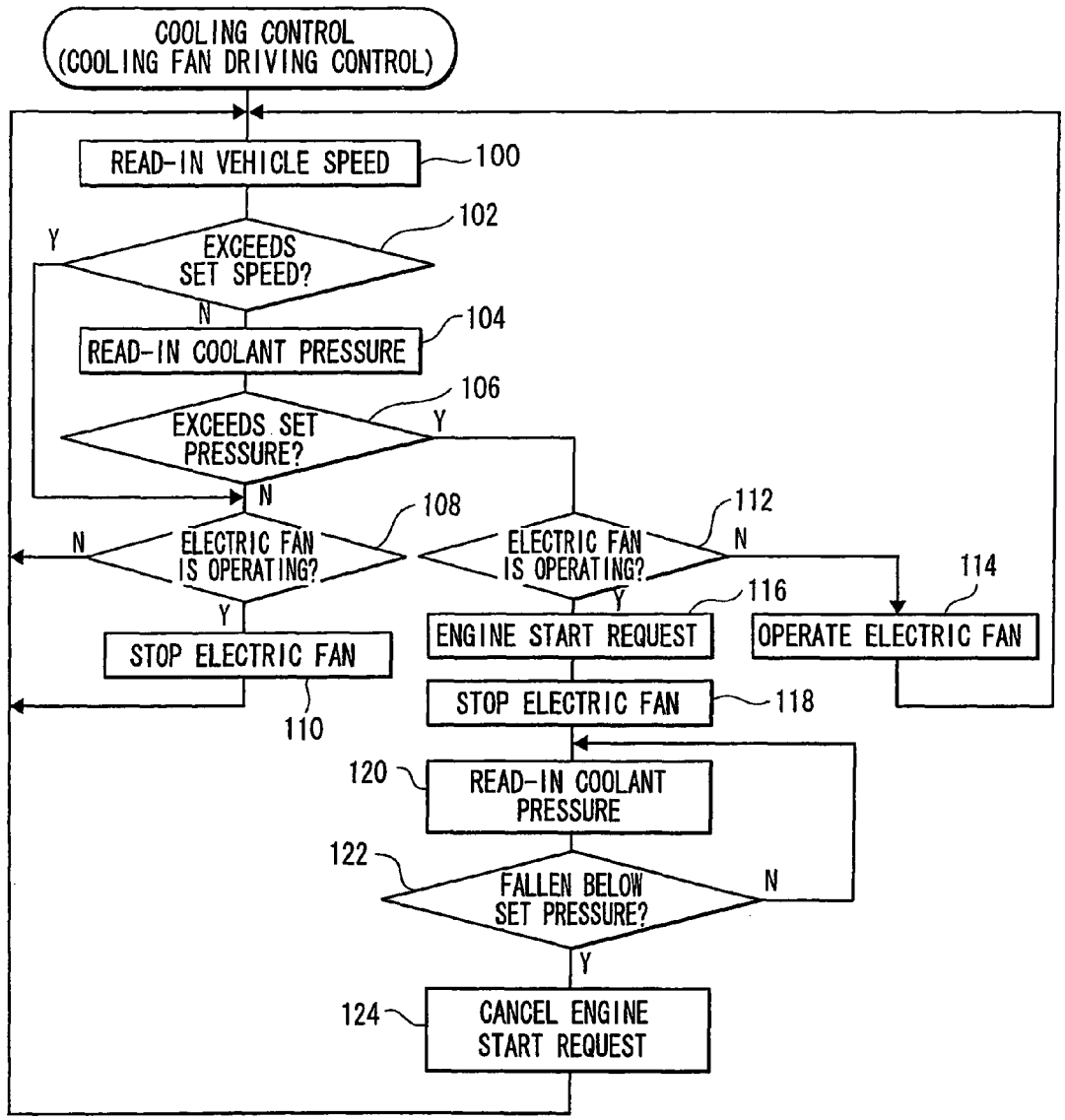
FIG. 3 is a flowchart showing a summary of cooling processing relating to the first embodiment.

A summary of the processings which are executed at this time is shown in FIG. 3. Note that this flowchart is executed when the engine stoppage conditions are established and, on the basis of the engine stoppage conditions, the engine ECU 34 stops the engine 14, and further, this flowchart ends when the engine restart conditions are established and, on the basis of the engine restart conditions, the engine 14 is restarted. Namely, the cooling controller 32 executes cooling processing while the engine 14 is stopped, on the basis of the engine stoppage conditions and the engine restart conditions.

At the cooling controller 32, when the engine 14 is stopped on the basis of the engine stoppage conditions, in initial step 100, the engine ECU 34 reads-in the traveling speed of the vehicle 10 (hereinafter called traveling speed v) which is detected by vehicle speed sensor 36, and, in next step 102, confirms whether or not the vehicle speed v has reached a preset set speed (hereinafter called set speed vs).

Here, if the traveling speed v has not reached the set speed vs (v<vs), the judgment in step 102 is negative, and the routine moves on to step 104. In this step 104, the air conditioner ECU 40 reads-in the coolant pressure P of the condenser 20 which is detected by the pressure sensor 42, and, in next step 106, confirms whether or not the coolant pressure P exceeds a preset pressure (hereinafter called set pressure Ps).

Here, at the cooling device 16, when the traveling speed v of the vehicle 10 has not reached the set speed vs in the stopped state of the engine 14, there is the possibility that the cooling capacities of the engine radiator 18 and the condenser 20, and the condenser 20 in particular, will be insufficient.

Further, at the air conditioner, if the cooling capacity of the condenser 20 is lower than the heat load which is the air-cooling load, the coolant pressure P becomes high. When the coolant pressure P exceeds the set pressure Ps (P>Ps), the desired air-cooling capacity cannot be obtained.

Here, the cooling controller 32 makes negative judgments in step 102 and step 106, and starts cooling of the condenser 20 and the engine radiator 18.

Note that, when the traveling speed v exceeds the set speed vs (an affirmative judgment in step 102) or the coolant pressure P has not reached the set pressure Ps (an affirmative judgment in step 106), it is judged that a predetermined cooling capacity is being ensured, and the routine moves on to step 108. In step 108, it is confirmed whether or not the electric fan 24 is being driven, i.e., whether or not the fan motor 26 is being operated. In this way, when the fan motor 26 is being operated and the electric fan 24 is being driven, the judgment in step 108 is affirmative, the routine moves on to step 110, and, after the fan motor 26 is stopped, the routine returns to step 100.

On the other hand, when the coolant pressure P of the condenser 20 exceeds the set pressure Ps (P≧Ps), the judgment in step 106 is affirmative, and the routine moves on to step 112. In this step 112, first, it is confirmed whether or not the electric fan 24 is being driven and guiding of cooling wind using the electric fan 24 is being carried out.

Here, when the electric fan 24 is not being driven, the judgment in step 112 is negative, the routine moves on to step 114, and driving of the fan motor 26 is started. In this way, the guiding of cooling wind using electric fan 24 is carried out.

In this way, air at the vehicle front side is guided as cooling wind by the electric fan 24 and is pushed-in toward the condenser 20, and an increase in the cooling capacities of the condenser 20 and the engine radiator 18 is devised.

On the other hand, when the coolant pressure P of the condenser 20 exceeds the set pressure Ps regardless of the fact that the electric fan 24 is being driven, the judgment in step 112 is affirmative, and the routine moves on to step 116.

In this step 116, a request to drive the engine 14 is outputted to the engine ECU 34. Together therewith, in step 118, the driving of the electric fan 24 is stopped (stoppage of fan motor 26).

If an engine start request is inputted from the cooling controller 32 at the time when the engine stoppage conditions are established, the engine ECU 34 drives the engine 14.

In this way, the mechanical fan 22 is driven. The large amount of cooling wind which is sucked-in by the mechanical fan 22 passes through the condenser 20 and the engine radiator 18. The cooling capacity of the condenser 20 increases, and a decrease in the coolant pressure P is devised.

On the other hand, at the cooling controller 32, when an engine start request is carried out and the electric fan 24 is stopped, the routine moves on to step 120 and the coolant pressure P detected at the air conditioner ECU 40 is read-in, and in next step 122, it is confirmed whether or not the coolant pressure P has fallen below the set pressure Ps.

In this way, when the coolant pressure P falls below the set pressure Ps, the judgment in step 122 is affirmative, and the routine moves on to step 124 and the engine start request to the engine ECU 34 is cancelled.

At the engine ECU 34, when the engine start request is cancelled and the engine stoppage conditions are established, driving of the engine 14 is stopped. Note that, at this time, if the engine restart conditions are established, the engine ECU 34 drives the engine 14 continuously, regardless of the absence/presence of cancellation of the engine start request.

In this way, control of the cooling capacity with respect to the condenser 20 is carried out. An air conditioned state in which the vehicle occupants within the vehicle cabin do not feel discomfort is thereby maintained.

Further, when the cooling capacities which the engine radiator 18 and the condenser 20 need can be furnished by the wind blowing capacity of the electric fan 24, there is no need to drive the engine 14 needlessly. Therefore, a lowering of the fuel efficiency, and the like, can be suppressed.

Accordingly, accurate cooling using the condenser 20 can be carried out efficiently while carrying out economy running control of the engine 14. At this time, even if the engine capacity of the engine 14 is large and the cooling load of the engine radiator 18 is large, appropriate cooling of the engine radiator 18 is possible.

Note that, in the above-described present embodiment, the driving/stopping of the mechanical fan 22 and the electric fan 24 are carried out in accordance with whether or not the traveling vehicle speed v exceeds the set speed vs and whether or not the coolant pressure P exceeds the set pressure Ps. However, the set speed vs and the set pressure Ps may be provided with a difference (hysteresis) in the set value of the starting of driving of the mechanical fan 22 or the electric fan 24 and the set value of the stopping of driving.

Second Embodiment

A second embodiment of the present invention will be described next. Note that the basic structure of the second embodiment is the same as the above-described first embodiment, and, in the second embodiment, the same parts as the first embodiment are denoted by the same reference numerals, and description thereof is omitted.

In the above-described first embodiment, it is judged, from the traveling vehicle speed v, whether or not the engine radiator 18 and the condenser 20 are at predetermined cooling capacities, and, if the possibility that the predetermined cooling capacities cannot be obtained arises, it is confirmed, from the coolant pressure P of the condenser 20, whether or not a cooling capacity corresponding to the cooling load of the condenser 20 is being obtained. In the second embodiment, for each of the engine radiator 18 and the condenser 20, it is confirmed whether or not a cooling capacity corresponding to the cooling load is being obtained.

At this time, at the cooling controller 32, the engine ECU 32 reads-in a cooling water temperature Wt of the engine 14 detected by the temperature sensor 38, and, in accordance with whether or not the cooling water temperature Wt exceeds a preset set value (hereinafter called set temperature Wts), it is judged whether or not a cooling capacity corresponding to the heat load at the engine radiator 18 is being obtained.

Figure 4:
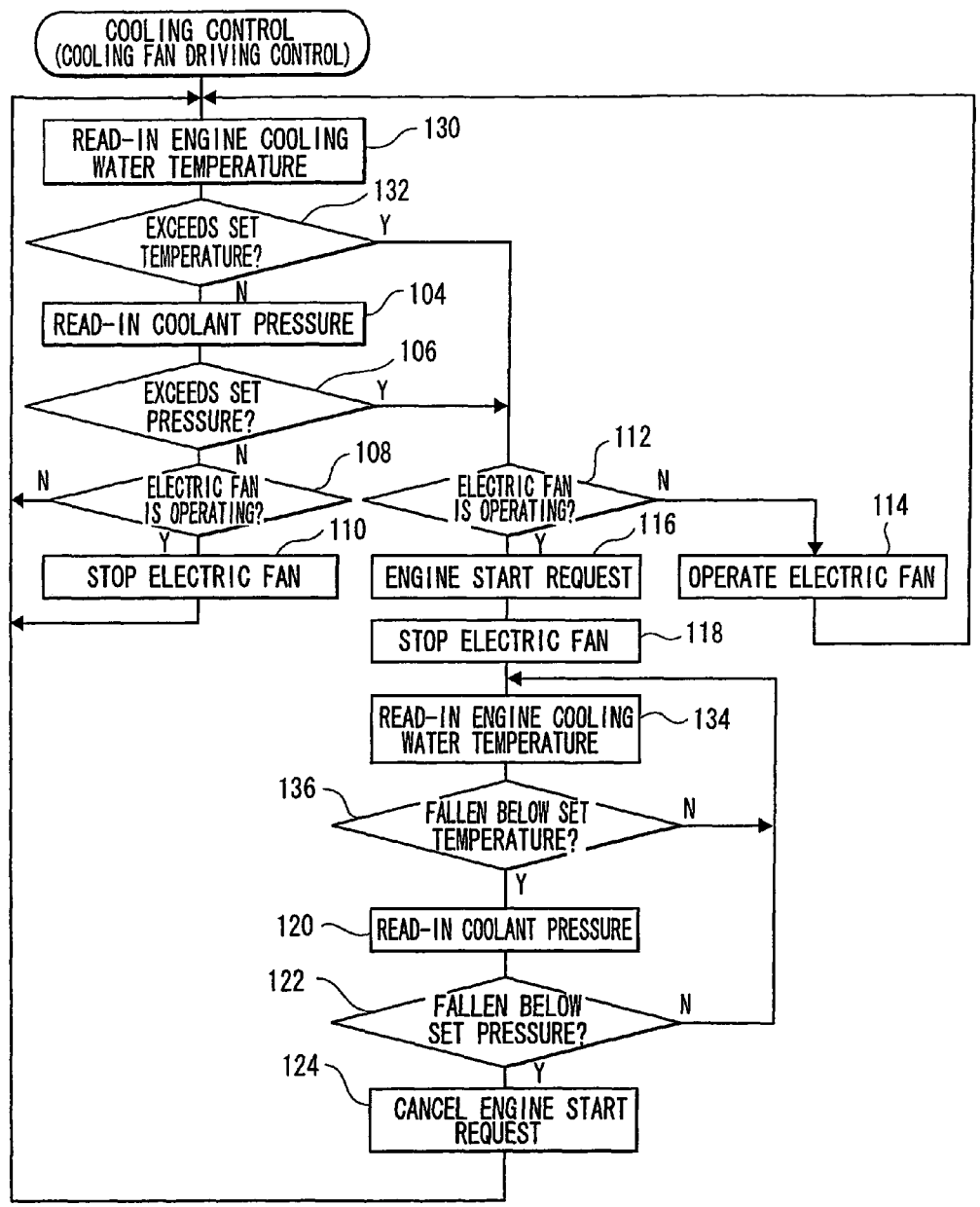
FIG. 4 is a flowchart showing a summary of cooling processing relating to a second embodiment.

A summary of cooling control relating to the second embodiment is shown in FIG. 4.

This flowchart is executed when the engine stop conditions are established and the engine ECU 34 stops the engine 14, and ends when the engine restart conditions are established and the engine 14 is restarted.

In this flowchart, when the engine 14 is stopped due to the establishment of the engine stoppage conditions, in initial step 130, the cooling water temperature Wt which the engine ECU 34 is detecting is read-in, and, in step 132, it is confirmed whether or not the cooling water temperature Wt exceeds the set temperature Wts.

Further, in step 104, the coolant pressure P is read-in from the air conditioner ECU 40, and, in step 106, it is confirmed whether or not the coolant pressure exceeds the set pressure Ps.

In this way, either if the judgment in step 106 is affirmative when the coolant pressure P exceeds the set pressure Ps (P≧Ps), or if the judgment in step 132 is affirmative when the cooling water temperature Wt exceeds the set temperature Wts (Wt≧Wts), the routine moves on to step 112 and cooling control is started.

Here, when the cooling load of the engine radiator 18 exceeds the cooling capacity of the engine radiator 18 or the cooling load of the condenser 20 exceeds the cooling capacity of the condenser 20 regardless of the fact that the electric fan 24 is being driven, the judgment in step 112 is affirmative, and an engine 14 start request is carried out (step 116), and the electric fan 24 is stopped (step 118).

Thereafter, in step 134, the cooling water temperature Wt of the engine 14 is read-in, and in next step 136, it is confirmed whether or not the cooling water temperature Wt has fallen below than the set temperature Wts. Further, in step 120, the coolant pressure P is read-in, and in next step 122, it is confirmed whether or not the coolant pressure P has fallen below the set pressure Ps.

Here, when the engine 14 is started on the basis of the engine 14 start request, and cooling of the engine radiator 18 and the condenser 20 by the mechanical fan 22 is started, and the cooling water temperature Wt falls below the set temperature Wts (Wt<Wts) and the coolant pressure P falls below the set pressure Ps (P<Ps), the judgments in step 136 and step 122 are affirmative, the routine moves on to step 124, the engine 14 start request is cancelled, and cooling using the mechanical fan 22 ends.

In this way, the driving of the mechanical fan 22 and the electric fan 24 is controlled while confirming whether or not a cooling capacity corresponding to the cooling load is being obtained for each of the engine radiator 18 and condenser 20 which are provided as heat exchangers for cooling. In this way, the air conditioning capacity (air-cooling capacity) of the air conditioner is ensured, and prevention of overheating of the engine 14 can be devised.

Third Embodiment

A third embodiment of the present invention will be described next. Note that the basic structure of the third embodiment is the same as the above-described first and second embodiments, and, in the third embodiment, the same parts as the first and second embodiments are denoted by the same reference numerals, and description thereof is omitted.

Figure 5:
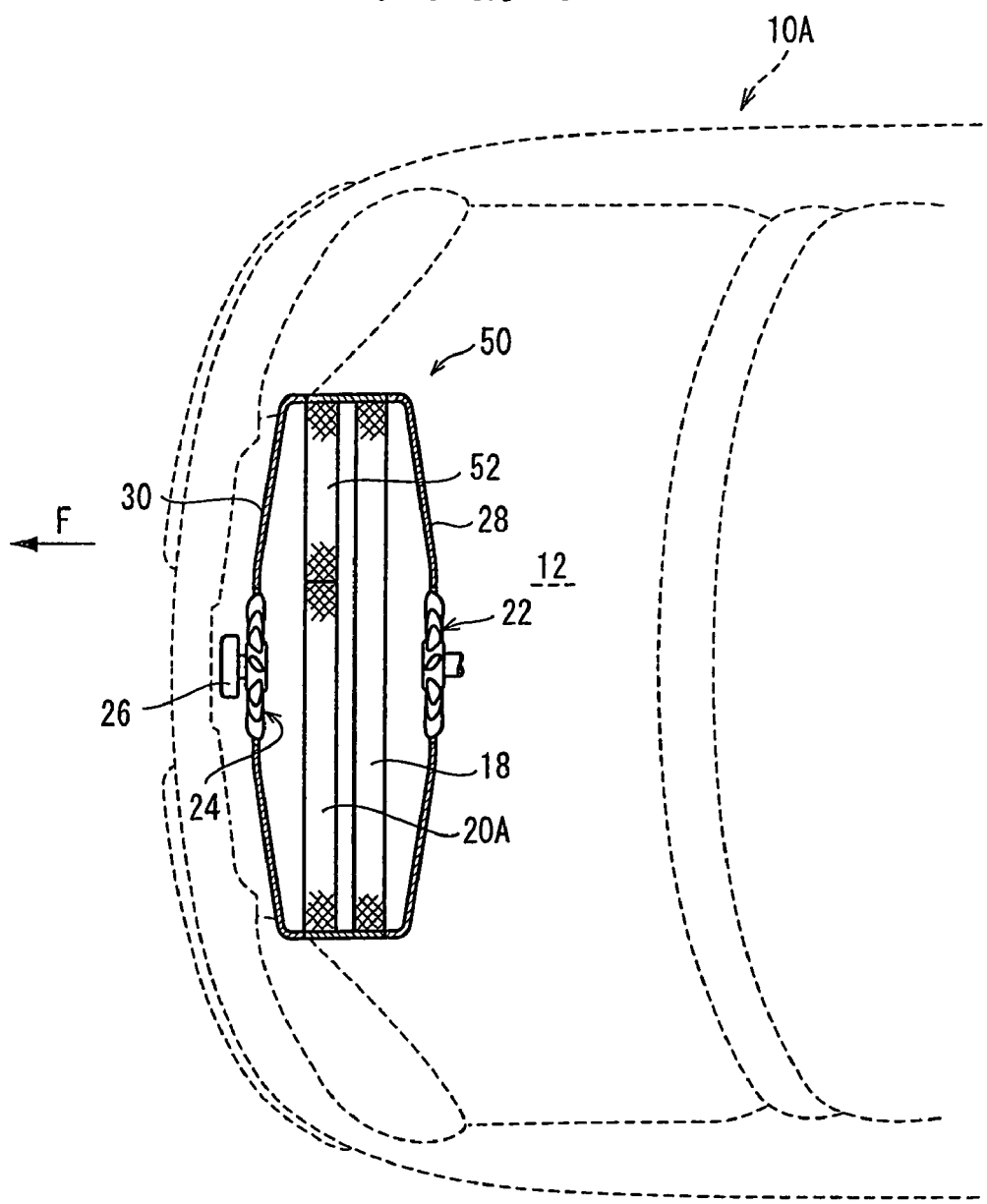
FIG. 5 is a schematic drawing of main portions of a vehicle relating to a third embodiment.

A summary of main portions of a vehicle 10A relating to the third embodiment are shown in FIG. 5. This vehicle 10A is a hybrid vehicle which can run by using an electric motor in addition to the engine 14 (neither of which are illustrated).

A cooling device 50 is disposed within the engine room 12 of the vehicle 10A. The cooling device 50 is provided with, as a heat exchanger for cooling and in addition to the engine radiator 18 and a condenser 20A, a radiator (hereinafter called HV radiator 52) which is used in cooling an inverter device which generates electric power for driving the electric motor from the electric power accumulated in the battery.

In the cooling device 50, the engine radiator 18 is disposed at the vehicle rear side, and the condenser 20A and the HV radiator 52 are disposed at the vehicle front side so as to be lined-up in the vehicle transverse direction. In this way, cooling wind is guided respectively to the condenser 20A and the HV radiator 52, and the cooling wind which has passed through the condenser 20A and the HV radiator 52 passes through the engine radiator 18.

Note that, in the cooling device 50, the condenser 20A and the HV radiator 52 are disposed at the vehicle front side and the engine radiator 18 is disposed at the vehicle rear side, but the arrangement of the heat exchangers for cooling is not limited to this. For example, the condenser 20A may be disposed at the vehicle front side, and the engine radiator 18 and the HV radiator 52 may be disposed so as to be lined-up in the vehicle transverse direction at the vehicle rear side of the condenser 20A. Further, the HV radiator 52, the condenser 20A, and the engine radiator 18 may be arranged in that order from the vehicle front side. In this way, an arbitrary arrangement which considers the sizes of the respective heat exchangers for cooling, or the like, can be applied.

In the cooling device 50, at the vehicle rear side, the fan shroud 28 is connected and the mechanical fan 22 is disposed, and, at the vehicle front side, the fan shroud 30 is connected and the electric fan 24 is disposed.

In this way, at the cooling device 50, when the vehicle 10A is traveling, when the mechanical fan 22 is being driven and when the electric fan 24 is being driven, the cooling wind which is guided from the vehicle front side passes through the condenser 20A, the HV radiator 52, and the engine radiator 18 respectively.

Figure 6:
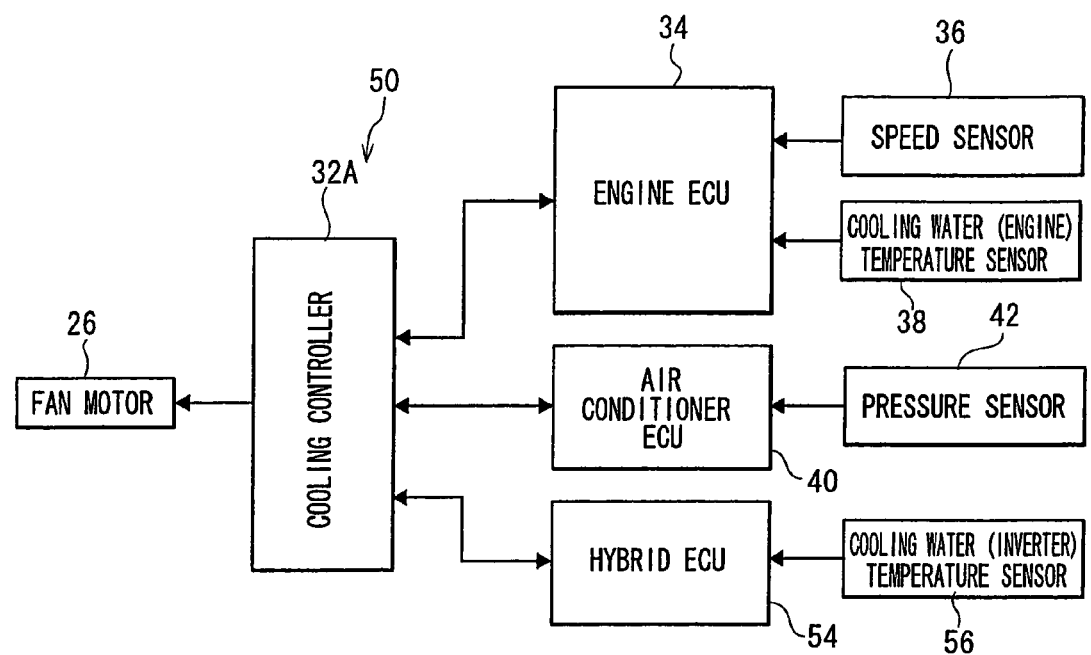
FIG. 6 is a block diagram of main portions including a cooling device relating to the third embodiment.

As shown in FIG. 6, a hybrid ECU 54, which controls the driving of an unillustrated electric motor for traveling and the accumulating of electric power used in driving the electric motor and the like, is provided at the vehicle 10A.

The engine ECU 34, the air conditioner ECU 40, and the hybrid ECU 54 are connected to a cooling controller 32A of the cooling device 50. Further, a temperature sensor 56, which detects the temperature of the cooling water which cools the inverter device, is connected to the hybrid ECU 54. The cooling controller 32A is such that the hybrid ECU 54 reads-in the cooling water temperature detected by the temperature sensor 56.

In the cooling device 50 which is structured in this way, driving of the mechanical fan 22 and the electric fan 24 is controlled on the basis of the respective cooling loads and cooling capacities of the engine radiator 18, the condenser 20A, and the HV radiator 52.

Figure 7:
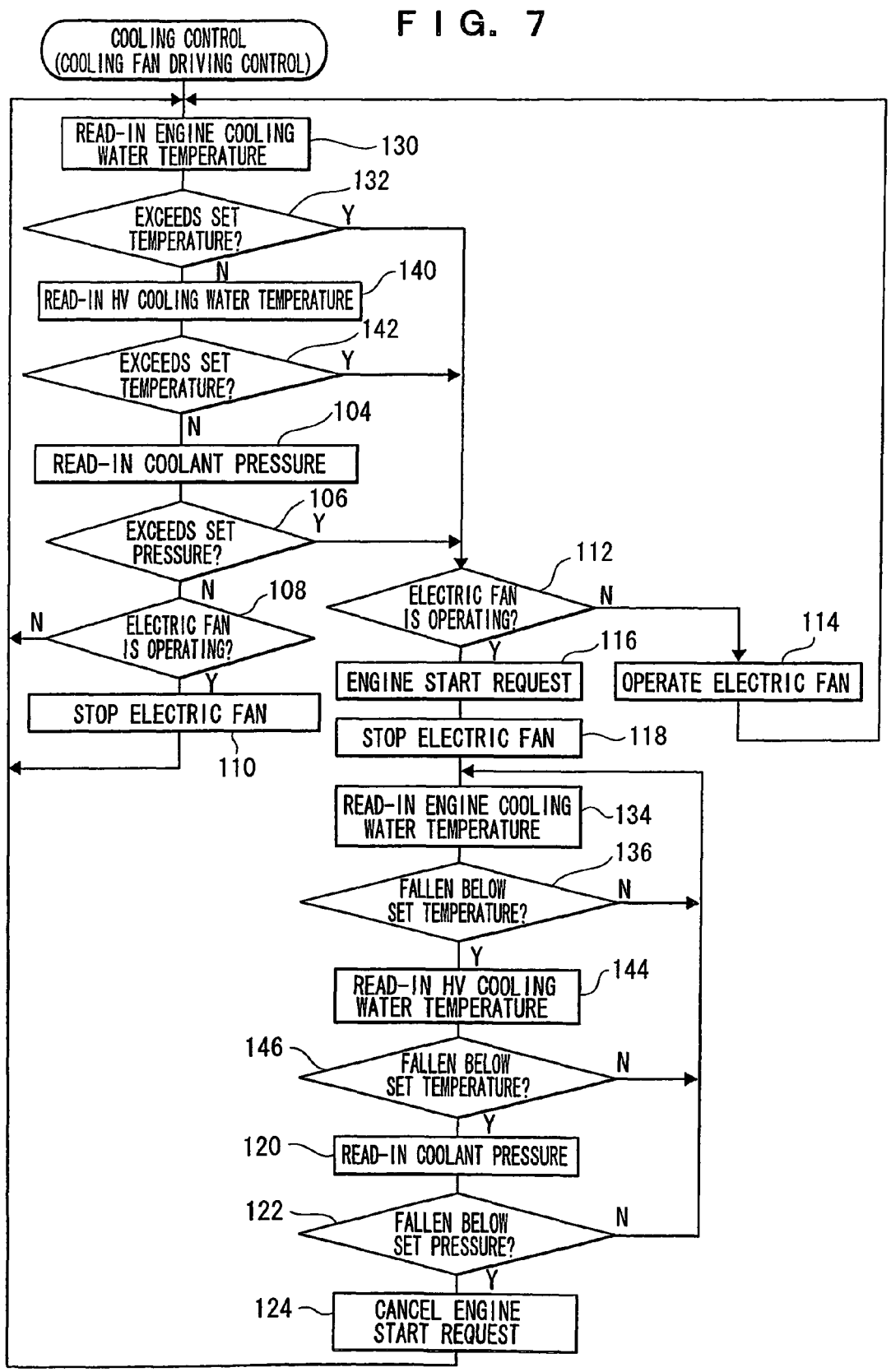
FIG. 7 is a flowchart showing a summary of cooling processing relating to the third embodiment.

A summary of the cooling processing at this time is shown in FIG. 7. This flowchart is executed when engine stoppage conditions are established and the engine ECU 34 stops the engine 14, and ends when engine restart conditions are established and the engine 14 is restarted.

When the engine stoppage conditions are established and driving of the engine 14 is stopped, first, the cooling controller 32A reads-in the cooling water temperature Wt of the engine 14 from the engine ECU 34 (step 130), and confirms whether or not the cooling water temperature Wt exceeds the set temperature Wts (step 132).

Further, in step 140, a cooling water temperature WIt of the inverter device is read-in from the hybrid ECU 54, and, in next step 142, it is confirmed whether or not the read-in cooling water temperature WIt exceeds a preset temperature (hereinafter called set temperature WIts).

Moreover, at the cooling controller 32A, the coolant pressure P is read-in from the air conditioner ECU 40 (step 104), and it is confirmed whether or not the coolant pressure P exceeds the set pressure Ps (step 106).

Here, if the cooling load becomes large with respect to the cooling capacity at any of the engine radiator 18, the condenser 20A or the HV radiator 52, the judgment in any of steps 108, 132, 142 is affirmative, and the routine moves on to step 112.

For example, if the cooling load becomes large with respect to the cooling capacity of the HV radiator 52 and the cooling water temperature WIt exceeds the set temperature WIts (WIt≧WIts), the judgment in step 142 is affirmative, and the routine moves on to step 112.

In this step 112, it is confirmed whether or not the electric fan 24 is being driven, i.e., whether or not cooling using the electric fan 24 is being carried out. If the electric fan 24 is stopped, the judgment in step 112 is negative, and the routine moves on to step 114. In this way, first, cooling using the electric fan 24 is carried out.

In this way, the cooling wind is pushed-into the condenser 20A and the HV radiator 52 respectively by the electric fan 24, and cooling of the coolant and the cooling water by this cooling wind is carried out.

In contrast, when the cooling capacity becomes low with respect to the cooling load regardless of the fact that cooling using the electric fan 24 is being carried out, the judgment in step 112 is affirmative, and the routine moves on to step 116.

In this way, an engine 14 start request is carried out with respect to the engine ECU 34, and the electric fan 24 is stopped (step 118).

In this way, cooling of the engine radiator 18, the condenser 20A and the HV radiator 52 using the mechanical fan 22 is started.

On the other hand, when the engine 14 start request is carried out, in step 134, the cooling water temperature Wt of the engine 14 is read-in, and it is confirmed whether or not the cooling water temperature Wt has become lower than the set temperature Wts (step 136).

Further, in step 144, the cooling water temperature WIt of the inverter device is read-in from the hybrid ECU 54, and, in next step 146, it is confirmed whether or not the cooling water temperature WIt has become lower than the set temperature WIts.

Moreover, at the cooling controller 32A, when the coolant pressure P is read-in (step 120), it is confirmed whether or not the coolant pressure P has become lower than the set pressure Ps (step 122).

When, due to the mechanical fan 22 being driven here, the cooling water temperatures Wt, WIt respectively become lower than the set temperatures Wts, WIts (Wt<Wts, WIt<WIts) and the coolant pressure P becomes lower than the set pressure Ps (P<Ps), the judgments of steps 136, 146, 122 are respectively affirmative, and the routine moves on to step 124.

In this way, the cooling controller 32A cancels the engine start request to the engine ECU 34. Due to the engine start request being cancelled, the engine ECU 34 carries out stopping and restarting of the engine 14 based on the engine stoppage conditions and the engine restart conditions.

In this way, also at the cooling device 50 which uses the engine radiator 18, the condenser 20A and the HV radiator 54, also at times when the engine capacity of the engine 14 is large and the cooling load of the engine radiator 18 is large, appropriate cooling is possible while suppressing driving of the engine 14 and without using the fan motor 26 whose output is large.

On the other hand, in the above-described present embodiment, the mechanical fan 22 is provided at the vehicle rear side of the heat exchangers for cooling, and the electric fan 24 which is driven by the fan motor 26 is provided at the vehicle front side, but the present invention is not limited to this.

Figure 8:
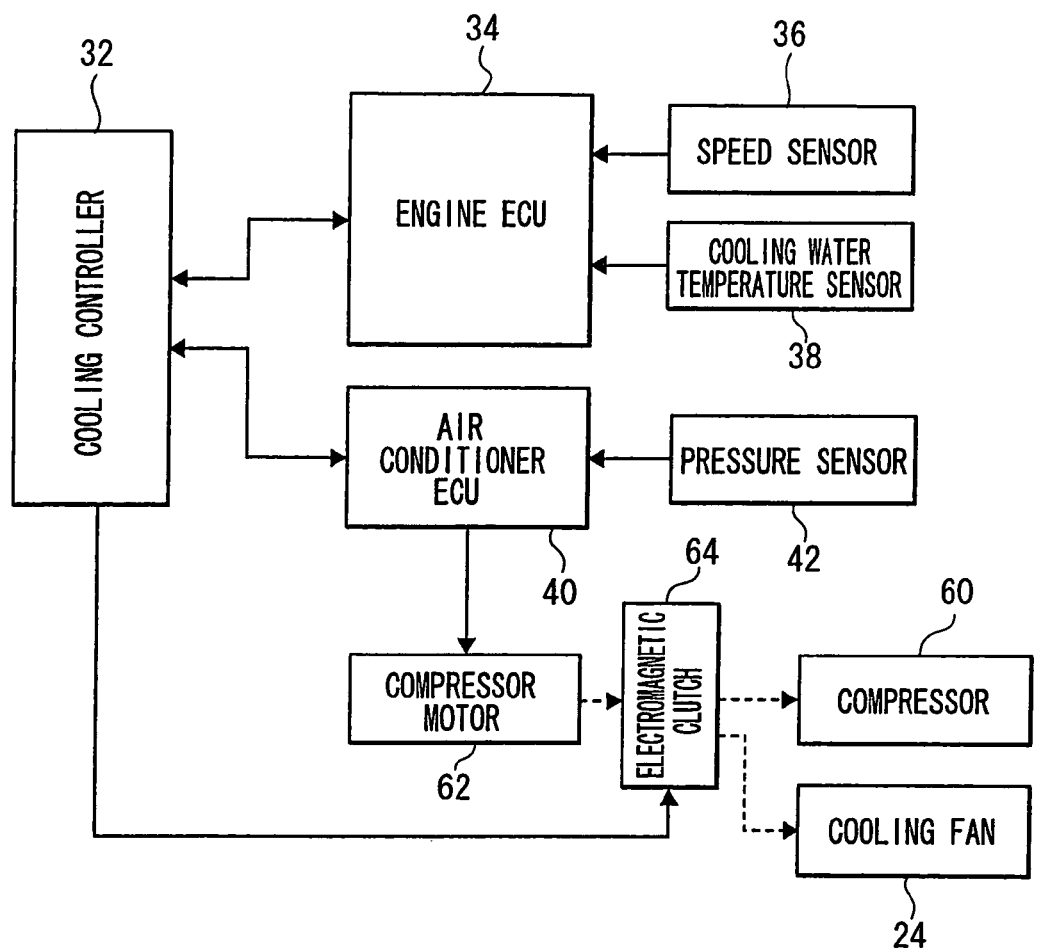
FIG. 8 is a block diagram of main portions including a cooling device showing another example to which the present invention is applied.

For example, as shown in FIG. 8, there are cases in which a compressor motor 62 is provided separately from the engine 14 as the drive source of a compressor 60 at an air conditioner provided in a hybrid vehicle.

When such a compressor motor 62 is provided, an electromagnetic clutch 64 is provided between the compressor 60 and the compressor motor 62. The driving force of the compressor motor 62 can be transferred to the compressor 60 and the electric fan 24 respectively via the electromagnetic clutch 64.

Further, the cooling controller 32 controls the on/off of this electromagnetic clutch 64, instead of the driving/stopping of the fan motor 26. In this way, the fan motor 26 can be omitted.

Moreover, when an electromagnetic clutch is provided, for example, the electromagnetic clutch may be provided at the cooling fan which is disposed at the vehicle rear side (e.g., the mechanical fan 22), and the drive source of this cooling fan may be switched by the electromagnetic clutch. Namely, the electromagnetic clutch is disposed such that the cooling fan is driven by either of the engine or the fan motor.

In this way, one cooling fan can be driven by either the engine or the fan motor. For example, the cooling fan and the fan shroud which are disposed at the vehicle front side of the heat exchangers for cooling (e.g., the electric fan 24 and the fan shroud 30) can be omitted.

When the cooling fan and the fan shroud are provided at the vehicle front side, there are cases in which a lowering of the efficiency of guiding the cooling wind arises. When the cooling fan is driven by the driving forces of different drive sources, the cooling fan and the fan shroud at the vehicle front side can be omitted. In this way, an improvement in the efficiency of guiding the cooling wind can be devised, and an improvement in the cooling efficiency at the time of using cooling wind can be devised.

Note that, in the above-described present embodiment, the cooling controllers 32, 32A are provided separately from the engine ECU 34 which is the engine control unit. However, the engine ECU 34 may also have the functions of the cooling controllers 32, 32A, and the engine stoppage conditions and engine restart conditions may include the absence/presence of an engine start request.

Namely, the engine ECU 34 judges the cooling load of the engine radiator 18, and judges the cooling load on a condenser 202 from the coolant pressure read-in from the air conditioner ECU 40. The engine ECU 34 controls the driving of the electric fan 24 on the basis of these judgment results, and, in a state in which the engine start request is cancelled, the engine stoppage conditions may be established, and, when an engine start request is being carried out, the engine restart conditions may be established.

At this time, the cooling load on the condenser 20 may be judged by the air conditioner ECU 40. When the air conditioner ECU 40 requests an increase in the cooling capacity of the condenser 20, the engine ECU 34 drives the electric fan 24, and, when the electric fan 24 is being driven, when the air conditioner ECU 40 requests an increase in the cooling capacity, it is judged that the engine restart conditions are established, and the engine 14 may be restarted.

Further, the above-described present embodiment does not limit the structure of the present invention. For example, in the present embodiment, explanation is given by using, as an example, the cooling of the engine radiator 18 and the condenser 20, and the engine radiator 18, the condenser 20A and the HV radiator 52. However, the heat exchangers for cooling which cool by using the cooling device to which the present invention is applied, and the combination of the heat exchangers for cooling, are not limited to this, and can be applied to arbitrary heat exchangers for cooling which are provided in a vehicle and combinations of arbitrary heat exchangers for cooling.

Next, examples of fourth and fifth embodiments will be described in detail hereinafter with reference to the drawings.

Fourth Embodiment

Figure 9:
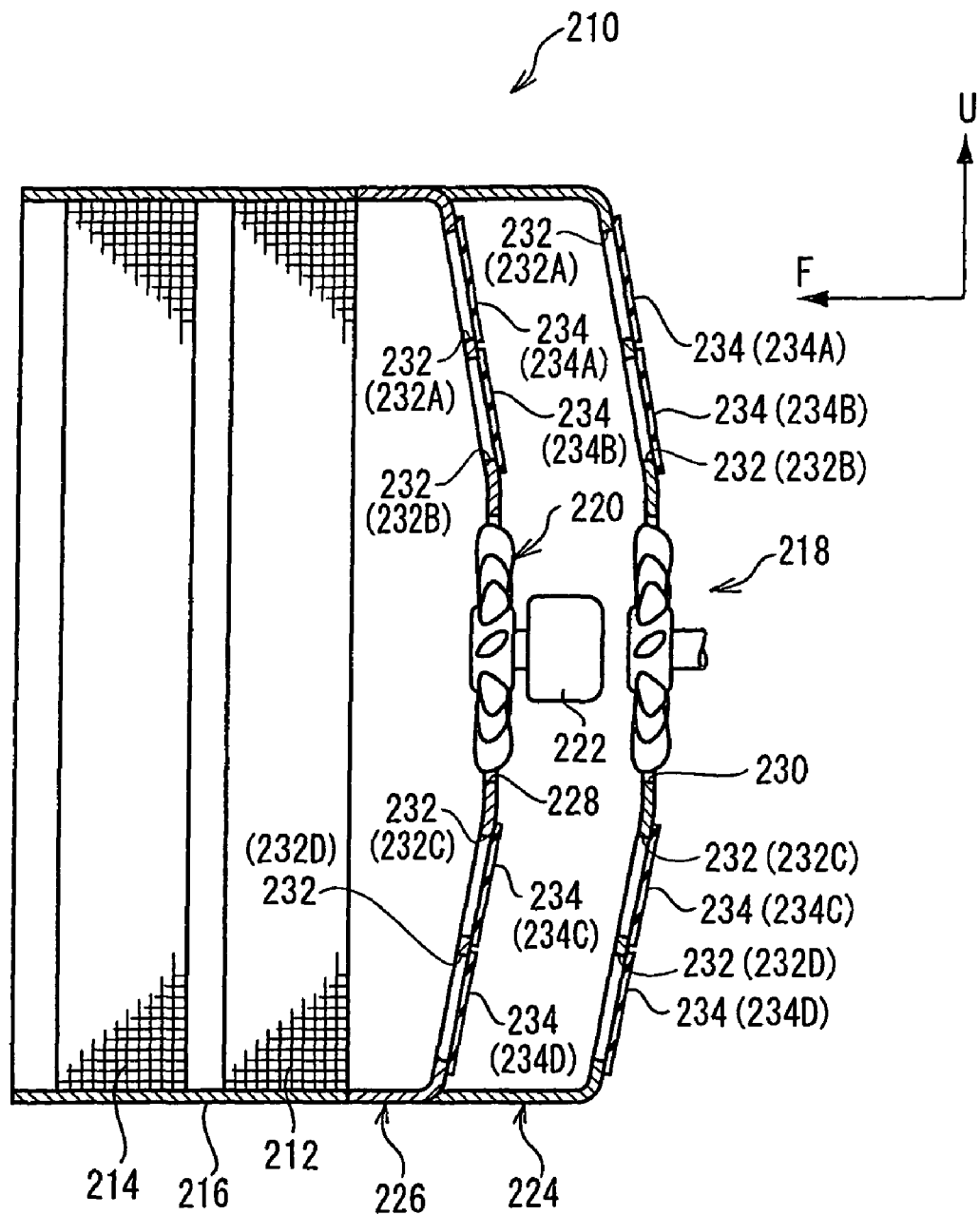
FIG. 9 is a schematic structural drawing of a guiding structure relating to a fourth embodiment.
Figure 10:
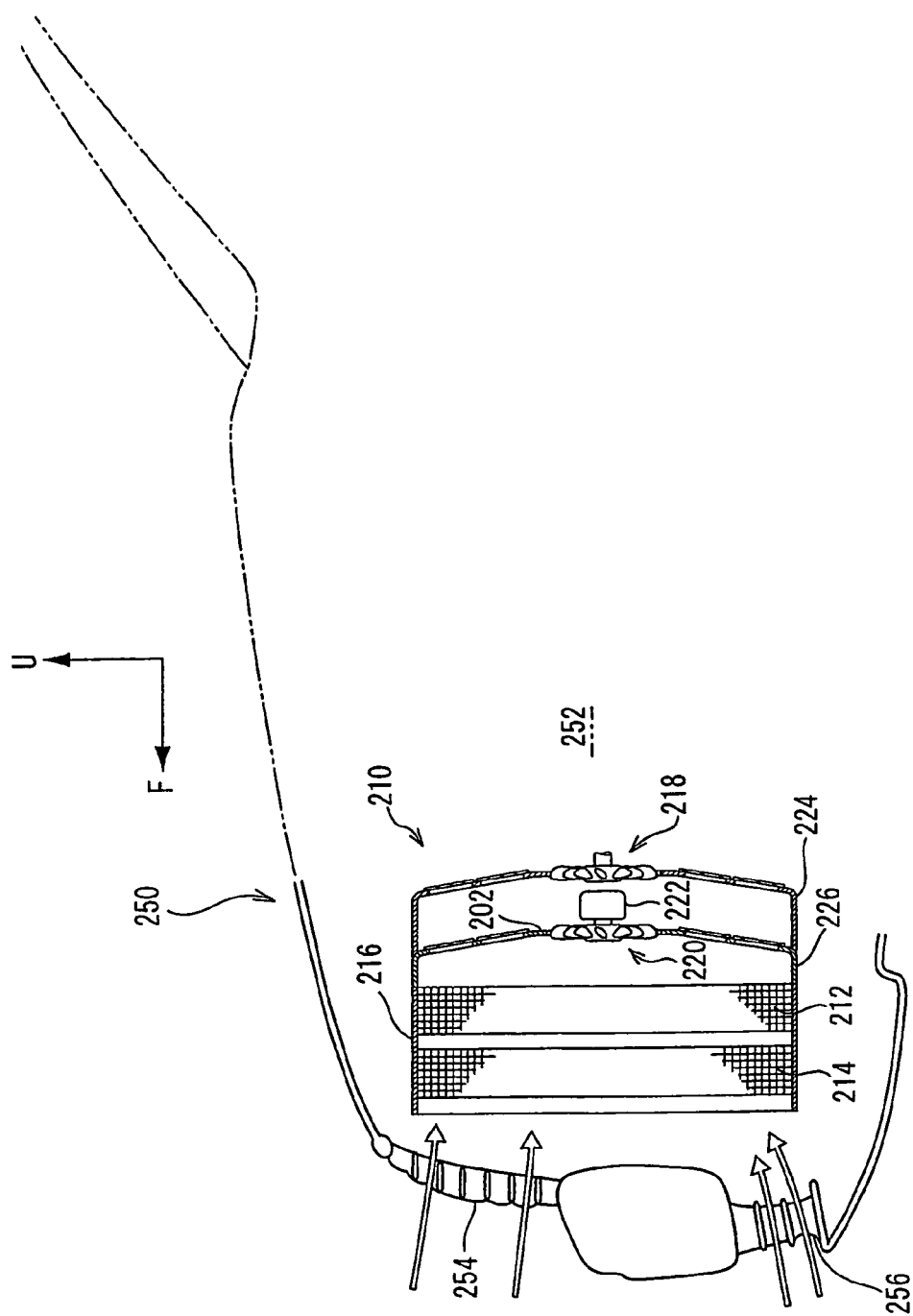
FIG. 10 is a schematic drawing of a vehicle front portion showing the placement of a cooling unit.

The schematic structure of a cooling unit 210, to which a guiding structure relating to a fourth embodiment is applied, is shown in FIG. 9. As shown in FIG. 10, the cooling unit 210 is disposed within an engine room 252 of the front portion of a vehicle 250, and, via a radiator grill 254 and a bumper grill 256 which are formed at the front end portion of the vehicle 250, guides air at the front as cooling wind, and cooling using this cooling wind is carried out.

Note that, hereinafter, the frontward direction in the vehicle front-rear direction of the vehicle 250 in which the cooling unit 210 is mounted is the direction of arrow F, and upward in the top-bottom direction is shown as the direction of arrow U. Further, the direction which is orthogonal to the direction of arrow F and the direction of arrow U respectively is the vehicle transverse direction (the transverse direction of the vehicle 250).

As shown in FIG. 9, an engine radiator 212 and a condenser 214 are provided at the cooling unit 210 as first and second heat exchangers for cooling. The engine radiator 212 uses cooling water (engine cooling water) as a coolant, and this cooling water is circulated between the engine radiator 212 and an unillustrated engine. The engine radiator 212 cools the cooling water by carrying out heat exchange between the cooling wind and the cooling water.

The condenser 214 forms, between an unillustrated compressor and evaporator, a refrigeration cycle for an air conditioning device (air conditioner) provided at the vehicle 250, and cools the coolant by the cooling wind.

At the cooling unit 210, the condenser 214 is disposed at the vehicle front side of the engine radiator 212. Further, the engine radiator 212 and the condenser 214 are disposed within a guiding duct 216. In this way, the air, which enters into the guiding duct 216 from the vehicle front side via the radiator grill 254 or the bumper grill 256 (see FIG. 10), passes through the interiors of the condenser 214 and the engine radiator 212 in that order as cooling wind.

Note that the guiding duct 216 projects out from the condenser 214 toward the vehicle front side. In this way, the air within the engine room 252, in which the cooling unit 210 is disposed, is prevented from entering-into the guiding duct 216 from the vehicle front side.

On the other hand, a cooling fan 218 which is a first cooling fan, and a cooling fan 220 which is a second cooling fan, are provided at the cooling unit 210. The cooling fan 218 is disposed further toward the vehicle rear side than the engine radiator 212, and is a mechanical fan which is rotated and driven by an unillustrated engine.

Further, the cooling fan 220 is disposed at the vehicle front side of the cooling fan 218, between the engine radiator 212 and the cooling fan 218. Moreover, the cooling fan 220 is connected to the driving shaft of a fan motor 222, and is an electric fan which is rotated and driven by driving force of the fan motor 222.

In this way, at the cooling unit 210, due to either one of the cooling fan 218 or the cooling fan 220 operating, an increase in the amount of the cooling wind sucked-into the guiding duct 216 from the vehicle front side is devised. Namely, at the cooling unit 210, the cooling fans 218, 220 are suction fans, and suck the air at the vehicle front side in as cooling wind into the guiding duct 216 from the radiator grill 254 or the bumper grill 256, and the sucked-in cooling wind passes through the condenser 214 and the engine radiator 212 and is sent toward the vehicle rear side. In this way, cooling of the cooling water and the coolant of the air conditioner is devised.

By the way, a fan shroud 224, which is a first fan shroud which encloses the periphery of the cooling fan 218, and a fan shroud 226, which is a second fan shroud which encloses the periphery of the cooling fan 220, are provided at the cooling unit 210. Note that the basic structures of the fan shrouds 224, 226 are the same, and, hereinafter, mainly the fan shroud 226 will be described as an example.

Figure 11:
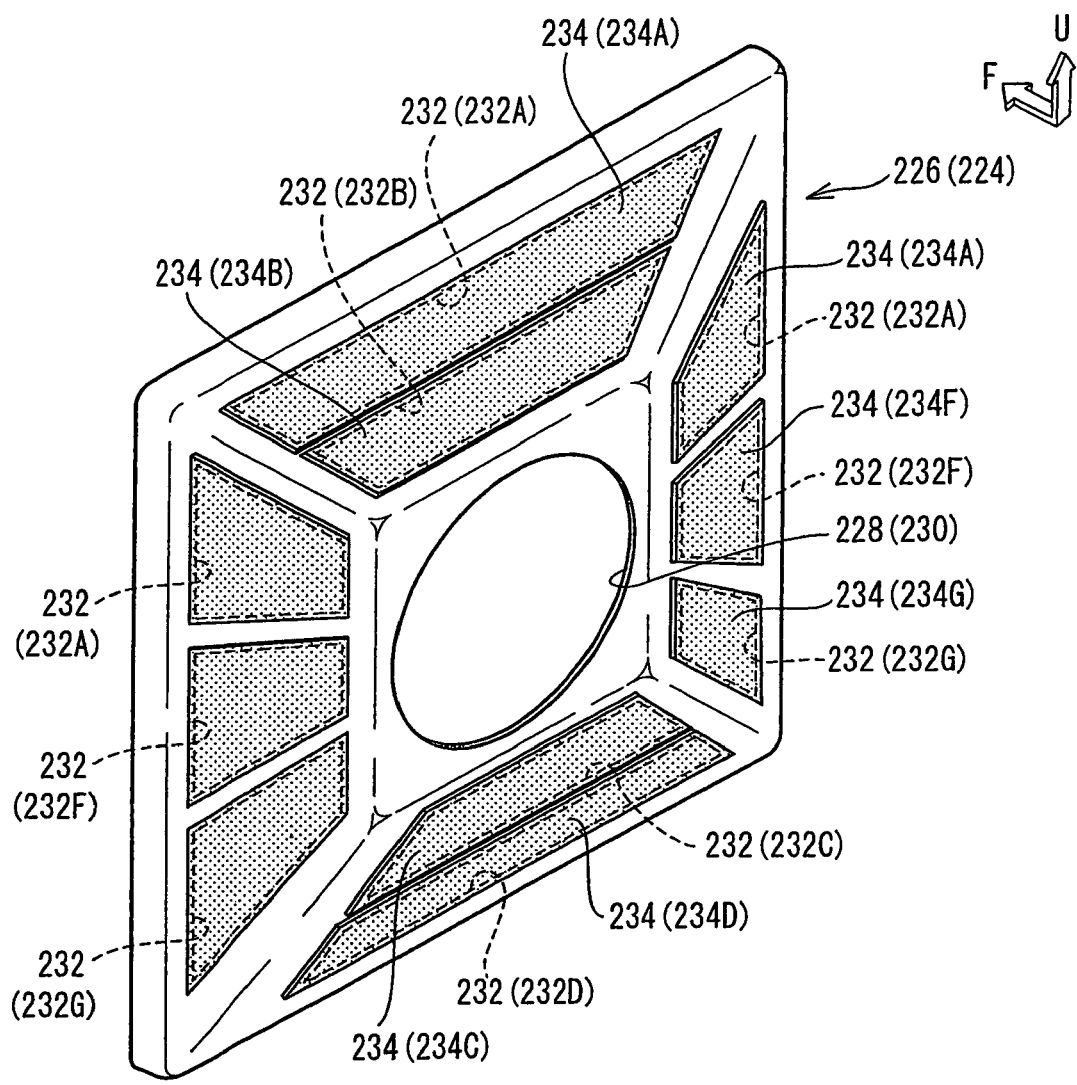
FIG. 11 is a perspective view of main portions showing a summary of a fan shroud relating to the fourth embodiment.

As shown in FIG. 11, the fan shroud 226 is formed substantially in the shape of a box whose interior is hollow and whose one surface is open. As shown in FIG. 9, the peripheral edge portion of the open surface side of the fan shroud 226 is connected to the vehicle rear side end portion of the guiding duct 216. Further, the peripheral edge portion of the open surface side of the fan shroud 224 is tightly connected to the vehicle rear side surface of the fan shroud 226.

In this way, at the cooling unit 210, the air within the engine room 252 is prevented from entering-in within the fan shrouds 224, 226.

On the other hand, as shown in FIG. 11, a fan opening 228 which is circular is formed in the central portion of the vehicle rear side surface of the fan shroud 226. As shown in FIG. 9, the cooling fan 220 is disposed within the fan opening 228. Note that a fan opening 230 is formed in the fan shroud 224, and the cooling fan 218 is disposed within this fan opening 230.

As shown in FIG. 11, a large number of ventilation openings 232 are formed at the periphery of the fan opening 228 in the vehicle rear side surface of the fan shroud 226. Note that, in the present embodiment, as an example, ventilation openings 232A, 232B are formed above the fan opening 228, ventilation openings 232C, 232D are formed below, and ventilation openings 232E, 232F, 232G are formed at the both sides in the vehicle transverse direction. Note that, in the fan shroud 224 as well, the ventilation openings 232A through 232G are formed at the periphery of the fan opening 230. Further, hereinafter, when the ventilation openings 232A through 232G are referred to collectively, they are called the ventilation openings 232.

Further, blocking curtains 234 which block the ventilation openings 232 are provided at the fan shrouds 224, 226. Namely, blocking curtains 234A through 234G (hereinafter called blocking curtains 234 when referred to collectively) are provided at the fan shrouds 224, 226 for the ventilation openings 232A through 232G respectively.

Each of the blocking curtains 234 is formed so as to be thin-walled of an elastic member. Further, the configurations of the respective blocking curtains 234A through 234G are similar to the open configurations of the ventilation openings 232A through 232G which they oppose, and are formed to be slightly larger than the open configurations of the ventilation openings 232A through 232G.

The blocking curtains 234 are disposed at the vehicle rear side surfaces at each of the fan shrouds 224, 226. Further, the blocking curtains 234A through 234G are so-called hanging curtains in which the upper end portions thereof are fixed to, mounted to, and hang down from the upper peripheral edges of the ventilation openings 232A through 232G.

In this way, at the fan shrouds 224, 226, the ventilation openings 232 can be blocked by the blocking curtains 234.

The blocking curtain 234 can block and open the ventilation opening 232 due to the pressure difference at the vehicle front side and the vehicle rear side of the ventilation opening 232. Namely, due to the pressure at the vehicle front side of the ventilation opening 232 becoming lower than the vehicle rear side, the blocking curtain 234 blocks the ventilation opening 232. At this time, due to the blocking curtain 234 being formed by an elastic member, the peripheral edge portion of the blocking curtain 234 fits tightly to the peripheral edge portion of the ventilation opening 232, and can reliably block the ventilation opening 232.

Further, when the pressure at the vehicle front side of the ventilation opening 232 becomes higher than the vehicle rear side, the lower portion of the blocking curtain 234 flows toward the vehicle rear side and opens the ventilation opening 232. At this time, due to the blocking curtain 234 being formed by an elastic member, the deformation due to the pressure difference is easy, and the ventilation opening 232 can be opened reliably.

At the cooling unit 210, due to the ventilation openings 232 of the fan shrouds 224, 226 being opened, cooling wind passes through the ventilation openings 232 in accordance with the pressure difference.

Here, operation of the fourth embodiment will be described while referring to FIG. 12A and FIG. 12B.

At the cooling unit 210, due to the vehicle 250 traveling, air at the vehicle front side is introduced from the radiator grill 254 and the bumper grill 256 as cooling wind into the guiding duct 216. At this time, the cooling fan 218 or the cooling fan 220 operates. In this way, the introduction of cooling wind is promoted. Further, at the cooling unit 210, even while the vehicle is stopped, the cooling fan 218 or the cooling fan 220 operates. In this way, air at the vehicle front side is sucked-in into the guiding duct 216 as cooling wind.

At the cooling unit 210, the cooling wind, which is introduced-in or sucked-in into the guiding duct 216 from the vehicle front side, passes through the condenser 214 and the engine radiator 212. In this way, the coolant for air conditioning and the engine cooling water are cooled.

By the way, at the cooling unit 210, the cooling fans 218, 220 are provided, and the cooling fan 218 or the cooling fan 220 operates. In this way, an improvement in cooling efficiency is devised.

Figure 12A:
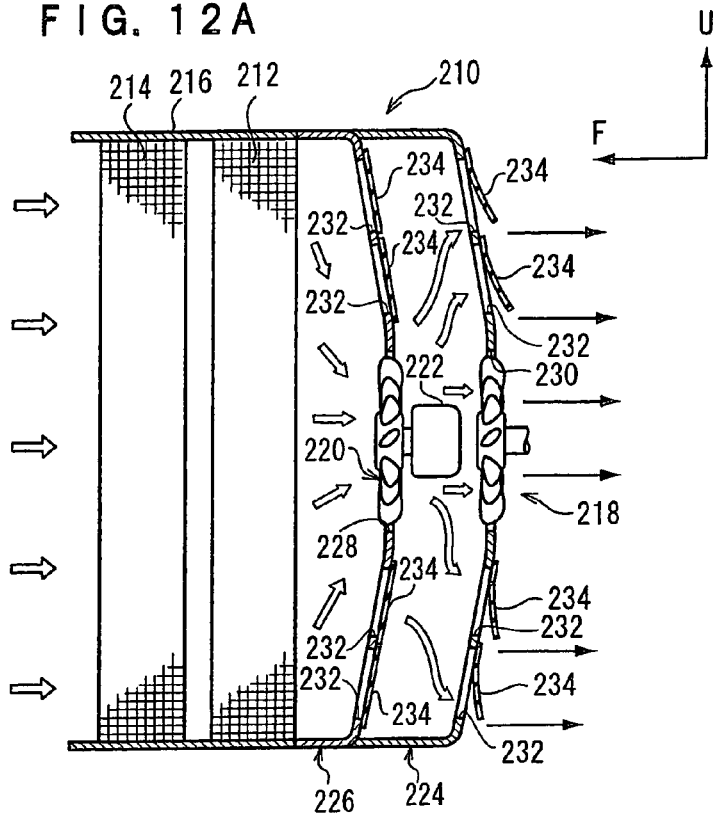
FIG. 12A is a schematic drawing showing the flow of cooling wind at a time when one cooling fan is driven.

As shown in FIG. 12A, at the cooling unit 210, in a state in which the rotating and driving of the cooling fan 218 is stopped due to stoppage of the engine or the like, when the fan motor 222 operates and the cooling fan 220 is rotated and driven, air at the vehicle front side is sucked-into the guiding duct 216 by the cooling fan 220. Note that, in FIG. 12A and FIG. 12B, a summary of the flow of the cooling wind is shown by the arrows.

When the cooling wind passes through the condenser 214 and the engine radiator 212, due to the cooling fan 220 driving, the cooling wind is sent-in into the fan shroud 224 at the vehicle rear side from the fan opening 228 which is formed in the fan shroud 226.

Because the pressure within the fan shroud 224 rises in this way, the respective blocking curtains 234 provided at the ventilation openings 232 of the fan shroud 226 reliably block the ventilation openings 232 of the fan shroud 226. The air within the fan shroud 224 is reliably prevented from entering into the fan shroud 226.

In contrast, within the fan shroud 224, with the cooling fan 218 in a stopped state, cooling wind is sent-in by the cooling fan 220. In this way, the pressure becomes high as compared with the vehicle rear side, and, in this way, the air within the engine room 252 is reliably prevented from entering-in from the fan opening 230.

Further, at the respective ventilation openings 232 formed in the fan shroud 224, the pressure within the fan shroud 224 is higher than the pressure at the vehicle rear side. In this way, the respective blocking curtains 234 open the respective ventilation openings 232.

In this way, the cooling wind, which is sent-in into the fan shroud 224 by the cooling fan 220, is discharged-out toward the vehicle rear side from the respective ventilation openings 232 formed in the fan shroud 224.

Figure 12B:
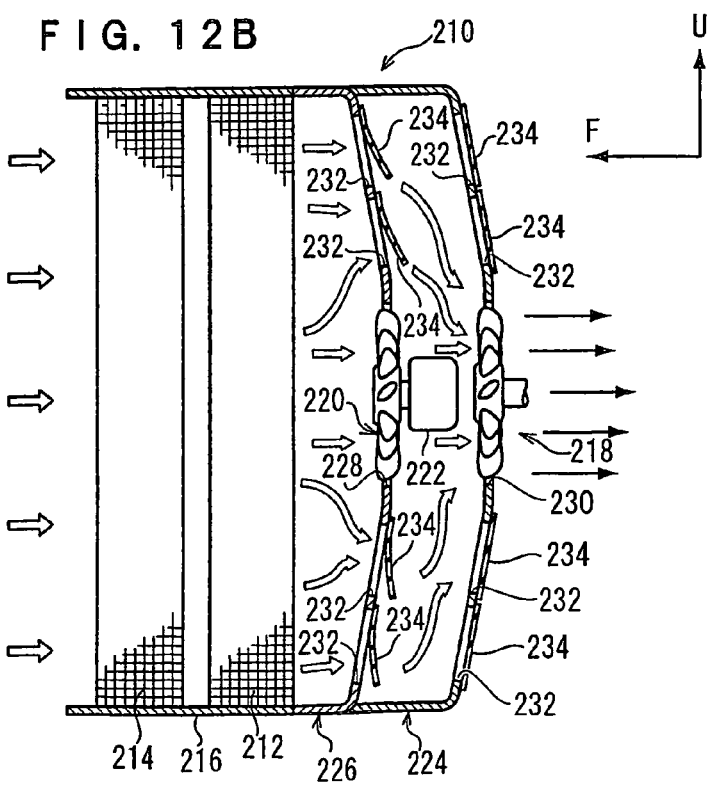
FIG. 12B is a schematic drawing showing the flow of cooling wind at a time when another cooling fan is driven.

On the other hand, as shown in FIG. 12B, at the cooling unit 210, due to the engine being driven for example, the cooling fan 218 is driven, and the cooling fan 220 stops. In this state, air at the vehicle front side is sucked-in into the guiding duct 216 by the cooling fan 218.

Here, when the cooling wind passes through the condenser 214 and the engine radiator 212, the cooling wind enters into the fan shroud 226.

At this time, due to the cooling fan 218 operating, the pressure within the fan shroud 224 becomes lower than the pressure at the vehicle rear side. Therefore, the respective ventilation openings 232 provided at the fan shroud 224 are blocked by the blocking curtains 234. Accordingly, at the fan shroud 224, the air within the engine room 252 is reliably prevented from entering-in from the fan opening 230 of course and from the respective ventilation openings 232.

Further, between the fan shroud 224 and the fan shroud 226, the pressure within the fan shroud 226 is higher than the pressure within the fan shroud 224. In this way, the respective blocking curtains 234 provided at the fan shroud 226 open the ventilation openings 232 which are formed in the fan shroud 226.

Accordingly, the cooling wind which passes through the engine radiator 212 passes through the ventilation openings 232 and the fan opening 228 formed in the fan shroud 226, and flows-in into the fan shroud 224, and further, is discharged-out from the interior of the fan shroud 224 toward the vehicle rear side via the fan opening 230 by the cooling fan 218.

In this way, at the cooling unit 210, also at times when either of the cooling fan 218 or the cooling fan 220 is operating, the amount of the cooling wind which is introduced-in does not decrease. Efficient cooling using the cooling wind is possible.

Further, at the cooling unit 210, both of the cooling fans 218, 220 suck-in air of the vehicle front side, and discharge air out toward the vehicle rear side. Therefore, also at times of using either of the cooling fans 218, 220, more efficient guiding of cooling wind is possible than when cooling wind is pushed-in from the vehicle front side. Efficient and reliable cooling of the engine radiator 212 and the condenser 214 respectively is possible.

Note that, in the cooling unit 210, for example, when both of the cooling fans 218, 220 are stopped while the vehicle is traveling, when the cooling wind which is introduced-in to the guiding duct 216 due to the vehicle traveling passes through the condenser 214 and the engine radiator 212, the cooling wind flows-in into the fan shroud 224 from the ventilation openings 232 formed in the fan shroud 226, and further, flows toward the vehicle rear side from the ventilation openings 232 formed in the fan shroud 224. In this way, also at times when the cooling fans 218, 220 are stopped, cooling of the engine radiator 212 and the condenser 214 is possible.

Fifth Embodiment

Next, a fifth embodiment of the present invention will be described. Note that the basic structure of the fifth embodiment is the same as the above-described fourth embodiment, and, in the fifth embodiment, the same parts as the fourth embodiment are denoted by the same reference numerals, and description thereof is omitted.

The schematic structure of a cooling unit 240 applied to the fifth embodiment is shown in FIG. 13. In this cooling unit 240, the cooling fan 218 and the fan shroud 224 which encloses the cooling fan 218 are connected to the vehicle rear side of the guiding duct 216 at which the engine radiator 212 and the condenser 214 are disposed. Note that the vehicle front side peripheral edge portion of the fan shroud 224 is tightly connected to the guiding duct 216. The air within the engine room 252 is prevented from entering-in from a vicinity of the connected portion.

By the way, at the cooling unit 240, the cooling fan 220 and a fan shroud 242 which encloses the periphery of the cooling fan 220 are provided at the vehicle front side. At the cooling unit 240, due to the cooling fan 220 operating, air at the vehicle front side is pushed-in into the guiding duct 216 as cooling wind from the radiator grill 254 or the bumper grill 256. Namely, at the cooling unit 240, the cooling fan 220 is provided as a so-called push-in fan.

Figure 14:
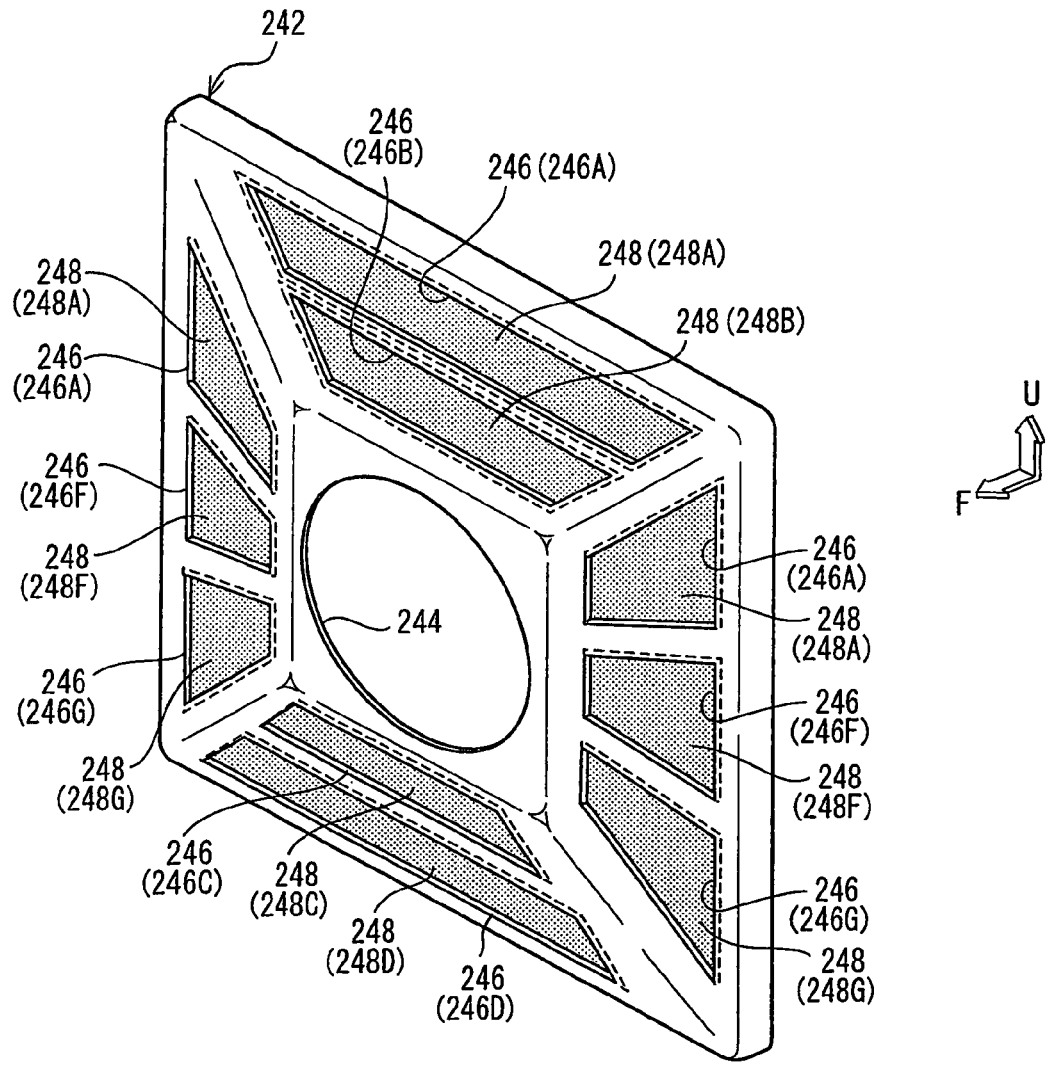
FIG. 14 is a perspective view of main portions showing a summary of a fan shroud relating to the fifth embodiment.
Figure 16:
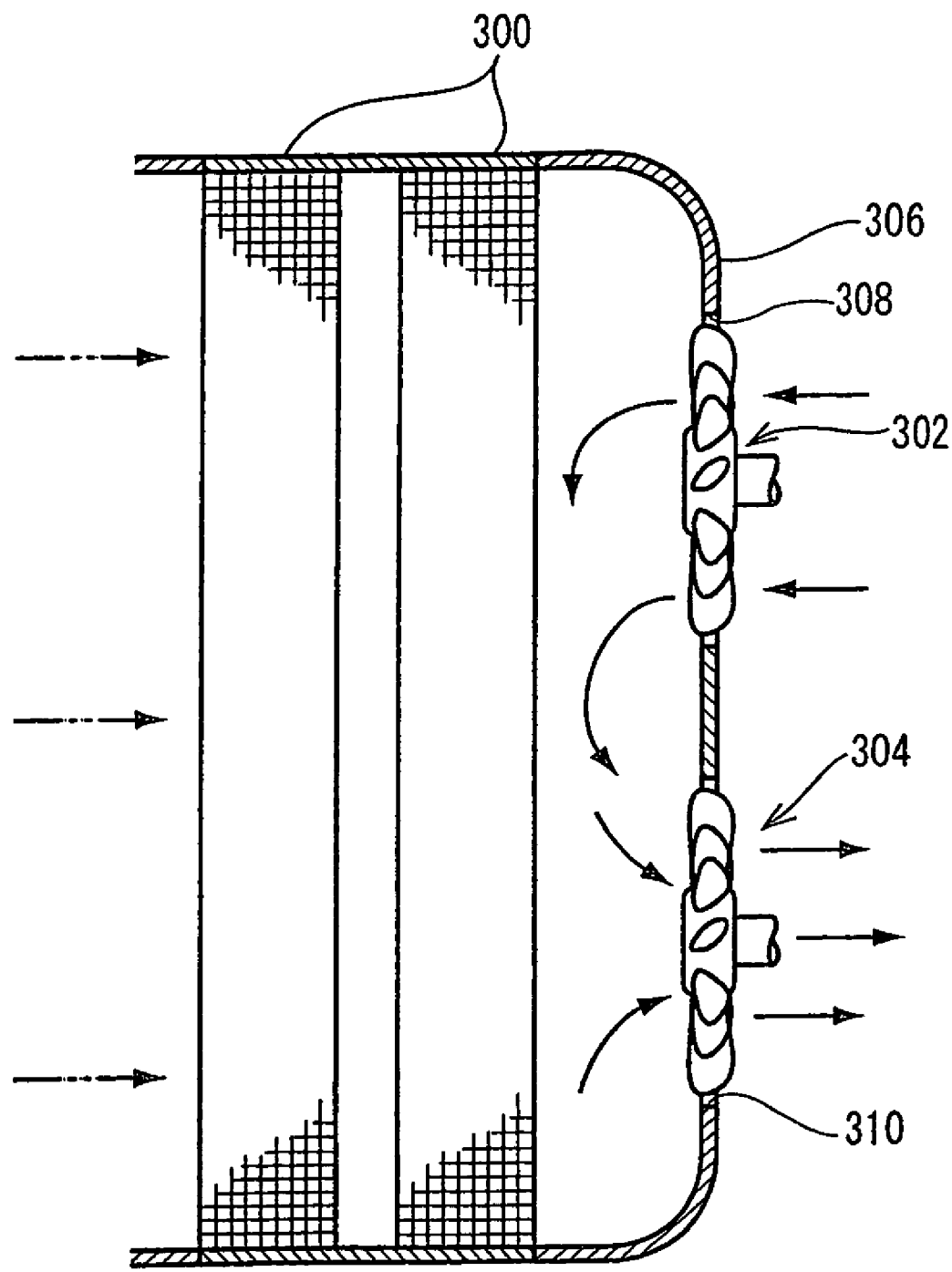
FIG. 16 is a schematic structural drawing showing an example of a guiding structure which is conceived of from conventional structures.

As shown in FIG. 14, the fan shroud 242 is formed substantially in the shape of a substantially rectangular box whose one surface is open. As shown in FIG. 13, at the cooling unit 240, the peripheral edge portion of the surface at the open side of the fan shroud 242 is tightly connected to the distal end, in the frontward direction of the vehicle, of the guiding duct 216.

As shown in FIG. 14, a fan opening 244 in which the cooling fan 220 is disposed is formed in the vehicle front side surface of the fan shroud 242.

Further, a large number of ventilation openings 246 are formed in the fan shroud 242 at the periphery of the fan opening 244, and blocking curtains 248 are provided at the respective ventilation openings 246. The blocking curtains 248 are formed so as to be thin-walled of elastic members, and the external configurations are similar to the open configurations of the ventilation openings 246 and are formed to be slightly larger than the ventilation openings 246.

Note that ventilation openings 246A through 246G (called ventilation openings 246 when referred to collectively) are formed in the fan shroud 242 which is applied to the fifth embodiment, and blocking curtains 248A through 248G (called blocking curtains 248 when referred to collectively) are provided at the ventilation openings 246A through 246A respectively.

Here, at the fan shroud 242, the respective blocking curtains 248 are disposed at the interior of the fan shroud 242 which is the vehicle rear side of the ventilation openings 246. The blocking curtains 248 hang down due to the respective upper end portions (upper end sides) of the blocking curtains 248 being fixed to the upper side peripheral edge portions of the ventilation openings 246.

In this way, at the fan shroud 242, due to the pressure within the fan shroud 242 becoming higher than the pressure of the air received from the vehicle front side, the ventilation openings 246 are blocked by the blocking curtains 248.

In the cooling unit 240 which is structured in this way, as shown in FIG. 15A, for example, in a state in which the engine is stopped and the rotating and driving of the cooling fan 218 are stopped, when the fan motor 222 operates and the cooling fan 220 is rotated and driven, air at the vehicle front side is introduced-in from the radiator grill 254 and the bumper grill 256 and pushed-in into the guiding duct 216 by the cooling fan 220.

When this cooling wind passes through the condenser 214 and the engine radiator 212, it is sent-in into the fan shroud 224.

At this time, if the vehicle 250 is stopped, at the respective ventilation openings 246 formed in the fan shroud 242, the pressure within the fan shroud 242 becomes higher than the pressure of the air received from the vehicle front side. In this way, at the fan shroud 242, the respective ventilation openings 246 are blocked by the blocking curtains 248.

Further, at the fan shroud 224, in the state in which the cooling fan 218 is stopped, the pressure at the interior rises due to the cooling wind, which has passed through the engine radiator 212, flowing-in. In this way, the cooling wind which is sent-in into the fan shroud 224 is discharged-out from the respective ventilation openings 232 formed in the fan shroud 224.

On the other hand, as shown in FIG. 15B, at the cooling unit 240, the cooling fan 218 is driven. When the cooling fan 220 is stopped, the cooling wind is sucked-in into the guiding duct 216 by the cooling fan 218.

At this time, because the cooling fan 220 is stopped, the pressure within the fan shroud 242 becomes low, and the blocking curtains 248 open the ventilation openings 246 which are formed in the fan shroud 242.

In this way, air at the vehicle front side is sucked-in from the ventilation openings 246 of the fan shroud 242 as cooling wind.

At the fan shroud 224, due to the cooling fan 218 operating, the ventilation openings 232 are blocked by the blocking curtains 234, and the air within the engine room is prevented from entering-in. Further, due to the operating fan 218 operating, the cooling wind which has passed through the engine radiator 212 is sent-out toward the vehicle rear side from the fan opening 230 by the cooling fan 218.

In this way, in the cooling unit 240 applied to the fifth embodiment as well, also at times when either of the cooling fan 218 or the cooling fan 220 is operated, the amount of the cooling wind which is introduced-in does not decrease, and efficient cooling using the cooling wind is possible.

In this cooling unit 240 as well, in the same way as the above-described cooling unit 210, when both of the cooling fans 218, 220 are stopped during traveling of the vehicle, the ventilation openings 246 in the fan shroud 242 are opened by the pressure received due to the vehicle traveling. Air at the vehicle front side is introduced-in as cooling wind from the ventilation openings 246 of the fan shroud 242. The cooling wind, which has passed through the condenser 214 and the engine radiator 212, flows toward the vehicle rear side from the ventilation openings 232 formed in the fan shroud 224. In this way, also at times when the cooling fans 218, 220 are stopped, cooling of the engine radiator 212 and the condenser 214 is possible.

Further, at the cooling unit 240, because the cooling fan 220 is disposed at the vehicle front side of the condenser 214, there is no need to provide a large space at the vehicle rear side, and ensuring the setting space within the engine room 252 is easy.

Note that, in the above-described present embodiment, explanation is given by using the substantially rectangular box-shaped fan shrouds 224, 226, 242 as the first and second fan shrouds, but the configurations of the fan shrouds are not limited to these, and an arbitrary configuration, which corresponds to the configuration of the heat exchanger for cooling or the guiding duct provided at the heat exchanger for cooling or the like, can be applied.

Further, the configurations and the numbers of the ventilation openings formed in the fan shrouds is not limited to the present embodiment, and can be made to be arbitrary configurations and numbers. At this time, it suffices for them to be sizes, configurations, and numbers which take into consideration of the passability of the cooling wind and the blocking ability by the blocking members.

Moreover, in the present embodiment, the blocking curtains 234, 248 which are formed so as to be thin-walled by elastic members are used as the blocking units, and open and close the ventilation openings 232, 246 by the pressure difference, but the structure of the blocking units applied to the present invention is not limited to this. For example, shutter structures using an actuator which is operated in accordance with the operations of the first and second cooling fans may be used. Further, the blocking units are not limited to this, and an arbitrary structure can be applied provided that they can open and close the ventilation openings at a desired timing.

Further, in the above-described present embodiment, explanation is given by using the engine radiator as the first heat exchanger for cooling and the condenser as the second heat exchanger for cooling, but the combination of the first and second heat exchangers for cooling is not limited to this.

For example, a radiator for a hybrid, which cools an inverter device provided in a hybrid vehicle, may be applied as the second heat exchanger for cooling, or a condenser and a radiator for a hybrid may be lined-up in the vehicle transverse direction or the top-bottom direction and form the second heat exchanger for cooling. Namely, each of the first and second heat exchangers for cooling may be formed by lining-up plural heat exchangers for cooling.

Next, sixth and seventh embodiments will be described hereinafter with reference to the drawings.

Sixth Embodiment

Figure 17:
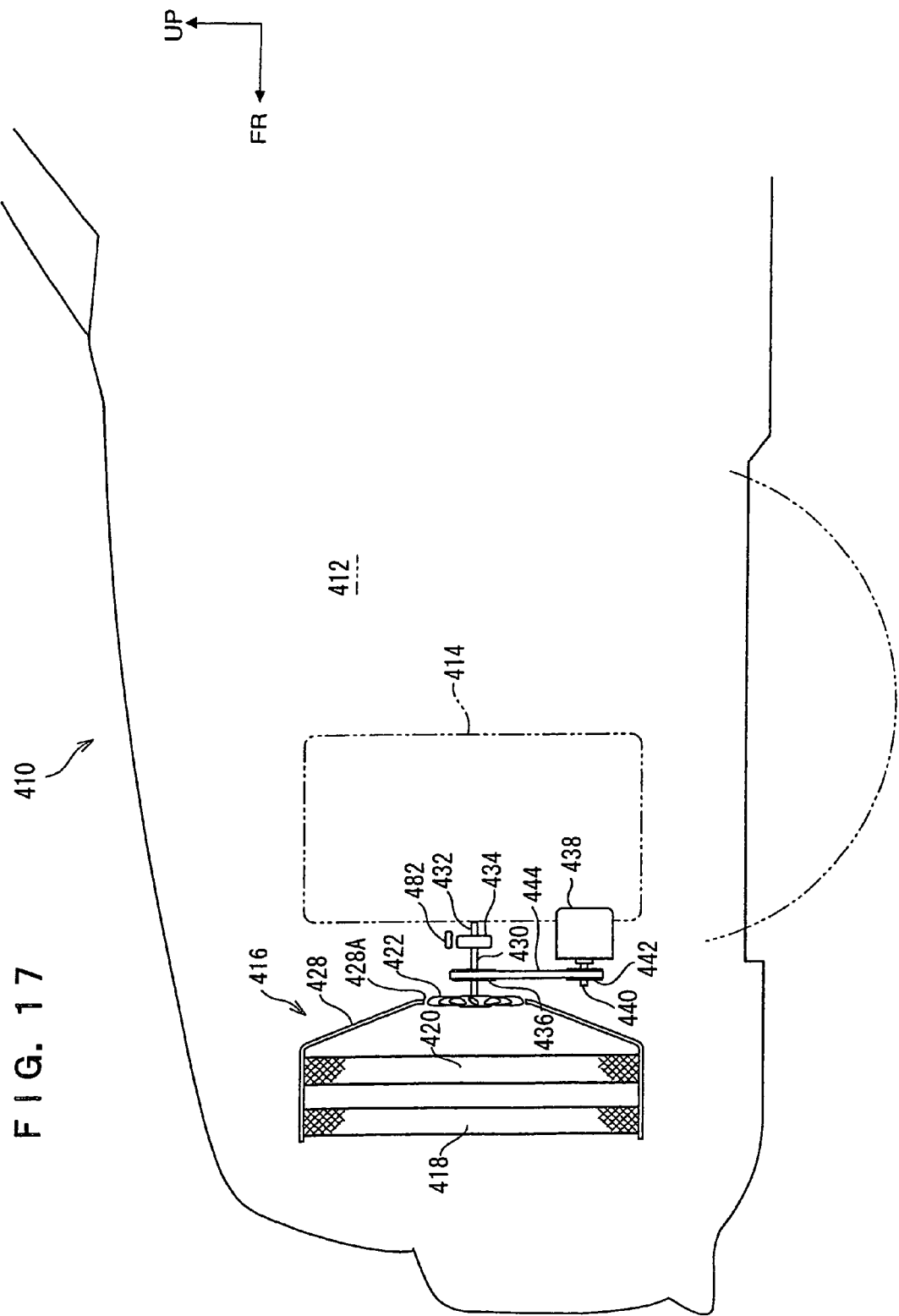
FIG. 17 is a schematic structural drawing of main portions of a vehicle relating to a sixth embodiment.

The schematic structure of main portions of a vehicle 410 applied to a sixth embodiment of the present invention is shown in FIG. 17. Note that, in FIG. 17, the front side in the vehicle front-rear direction is shown by the direction of arrow FR, and the upper side in the top-bottom direction of the vehicle is shown by the direction of arrow UP.

An engine 414, which is a drive source for traveling, is provided within an engine room 412 at the front portion of the vehicle 410. The vehicle 410 can travel due to the driving force of the engine 414. Further, an unillustrated electric motor is provided in the vehicle 410 as a drive source for traveling. The vehicle 410 is a so-called hybrid vehicle which, due to the electric motor being driven in a state in which the engine 412 is stopped, can travel due to the driving force of the electric motor.

Note that, in the present embodiment, the vehicle 410 which is a hybrid vehicle is described as an example, but the present invention is not limited to this, and can be applied to a vehicle of an arbitrary structure in which automatic idling stop control, which stops the driving of the engine 412 when the vehicle is stopped or the like, is carried out.

A cooling device 416 is disposed at the vehicle front side of the engine 414, in the engine room 412 of the vehicle 410. The cooling device 416 has, as heat exchangers for cooling, a condenser 418 disposed at the vehicle front side, and an engine radiator 420 disposed between the condenser 418 and the engine 414. Further, the cooling device 416 is provided with a cooling fan 422 which is disposed between the engine radiator 420 and the engine 414.

At the vehicle 410, due to forward traveling, air at the vehicle front side is guided as cooling wind from a radiator grill and a bumper grill (neither of which is illustrated). This cooling wind passes through the condenser 418 and the engine radiator 420. The coolants, which are circulated within the condenser 418 and the engine radiator 420, are cooled thereby.

Further, at the cooling device 416, the cooling fan 422 is operated. In this way, air at the vehicle front side is guided as cooling wind, and the cooling wind which passes through the condenser 418 and the engine radiator 420 is discharged-out toward the vehicle rear side.

Engine cooling water is used as the coolant at the engine radiator 420. At the engine radiator 420, heat exchange is carried out between the engine cooling water, which is circulated between the engine radiator 420 and the engine 414, and the cooling wind. The engine cooling water is cooled thereby.

Figure 18:
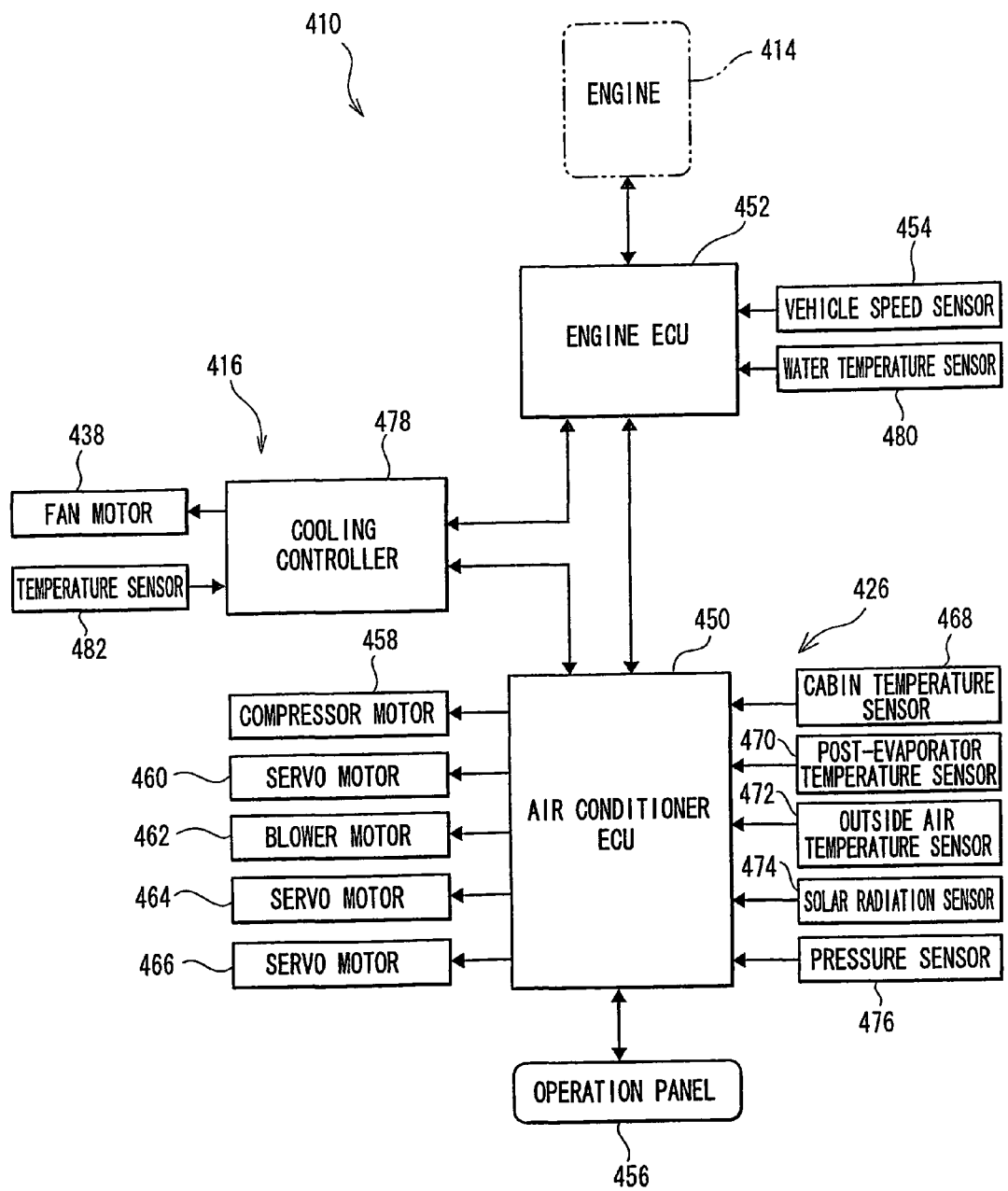
FIG. 18 is a schematic structural drawing showing the connection of an air conditioner ECU and an engine ECU and a cooling controller.

Further, an air conditioner device (hereinafter called air conditioner 426. Refer to FIG. 18), which conditions the air within the vehicle cabin, is provided in the vehicle 410. A refrigeration cycle, in which the coolant is circulated by the condenser 418 as well as a compressor, an expansion valve, and an evaporator (none of which are illustrated), is formed at the air conditioner 426. The coolant which is compressed by the compressor is cooled by passing through the condenser 418. When this coolant passes through the evaporator, air conditioned wind which is blown-out into the vehicle cabin is cooled. The air conditioner 426 has such a general structure.

Note that the cooling device 416 is provided with a fan shroud 428 which covers the engine 414 side of the engine radiator 420. The cooling fan 422 is disposed within a fan opening 428A which is formed in the fan shroud 428. In this way, cooling wind can be discharged-out to the vehicle rear side from the periphery of the cooling fan 422. Moreover, the air within the engine room 412 which is heated by the engine 414 is prevented from circling-in to the front side of the condenser 418 or the engine radiator 420 and lowering the cooling efficiencies of the condenser 418 and the engine radiator 420.

By the way, a rotating shaft 430 of the cooling fan 422 is connected, via a fan coupling 434, to a rotating shaft 432 which rotates due to the driving of the engine 414. In this way, due to the engine 414 being driven, the driving force of the engine 414 is transferred to the cooling fan 422, and the cooling fan 422 is rotated and driven.

A viscous fluid which can generate a shearing force, such as silicon oil or the like, is sealed in the fan coupling 434. Further, a pair of plates, one of which is connected to the rotating shaft 430 and the other of which is connected to the rotating shaft 432, is disposed within a housing. Note that the plates may be one pair, or may be plural pairs.

In this fan coupling 434, when the rotational speed (number of rotations) of the rotating shaft 432 is low, the rotating shaft 430 is rotated and driven at substantially the same speed as the rotating shaft 432, whereas, on the other hand, due to the rotational speed of the rotating shaft 432 becoming high, shearing force is generated at the viscous fluid, and the rotational speed of the rotating shaft 430 becomes low with respect to the rotational speed of the rotating shaft 432.

In this way, at the cooling device 416, when the number of rotations of the engine 414 is low, the cooling fan 422 is rotated at substantially the same number of rotations as the number of rotations of the engine 414, whereas, on the other hand, when the rotational speed of the engine 414 becomes high, the number of rotations of the cooling fan 422 can be prevented from rising. Further, at the fan coupling 434, due to shearing force being generated at the viscous liquid when the engine 414 starts, smooth starting of the cooling fan 422 is possible.

A fluid coupling of a general structure can be used as the fan coupling 434, and, provided that the basic functions are the same, a known fluid coupling including arbitrary functions can be applied.

A pulley 436 is disposed at the rotating shaft 430 of the cooling fan 422. Further, a fan motor 438 is disposed within the engine room 412, and an endless driving belt 444 is trained between a pulley 442, which is provided at a driving shaft 440 of the fan motor 438, and the pulley 436.

Further, a one-way clutch mechanism is provided at the pulley 436 to which the fan motor 438 is connected. When the engine 414 is driven in a state in which the fan motor 438 is stopped, the rotating shaft 430 and the pulley 436 rotate relatively. In a state in which the engine 14 is stopped, when the fan motor 438 operates and is rotated and driven, the fan motor 438 rotates integrally with the rotating shaft 430, and operation of the cooling fan 422 by the driving force of the fan motor 438 becomes possible.

Note that a known, arbitrary structure can be applied to the one-way clutch mechanism of the pulley 436. Further, instead of a one-way clutch mechanism, an electromagnetic clutch mechanism may be provided, and, when the fan motor 438 operates, the pulley 436 and the rotating shaft 430 may be made able to rotate integrally. Moreover, a one-way clutch mechanism may be provided at the pulley 442 of the driving shaft 440 of the fan motor 438.

On the other hand, as shown in FIG. 18, an air conditioner ECU 450, which controls operation of the air conditioner 426, and an engine ECU 452, which controls operation of the engine 414, are provided at the vehicle 410. Note that a hybrid ECU, which controls operation of an electric motor, is provided at the vehicle 410 which is a hybrid vehicle, but illustration thereof is omitted.

The engine ECU 452 and the unillustrated hybrid ECU detect, by various types of sensors, the driving-operating state of the vehicle 410 by the driver, the traveling state, and the like, and control the driving of the engine 414 and the electric motor such that traveling corresponding to the driving-operation of the vehicle 410 is possible.

At this time, the engine ECU 452 detects the traveling state of the vehicle and the driving-operating state by the driver, and, when the results of detection satisfy preset engine stoppage conditions (when engine stoppage conditions are established), the engine ECU 452 stops the driving of the engine 414, and, due to engine restart conditions being established, the engine ECU 452 carries out restarting (driving) of the engine 414.

Namely, when the engine ECU 452 detects a vehicle stopped state in which the traveling speed v of the vehicle 410 detected by a vehicle speed sensor 454 has become v=0, the engine ECU 452 carries out idle stop control which stops the engine 414, and an improvement in the fuel efficiency of the vehicle 410, suppression of emissions, suppression of noise, and the like are devised.

Further, the engine ECU 452 and the hybrid ECU drive the electric motor (economy running control) when preset motor driving conditions are established, such as when, during traveling of the vehicle 410, the engine stoppage conditions are established and the engine 414 is stopped, or when the load of the engine 414 becomes large from the traveling state of the vehicle 410, or the like. Note that known control methods can be applied to such traveling control by the engine ECU 452, and therefore, detailed description thereof is omitted here.

On the other hand, an operation panel 456, which is provided at the instrument panel for example and at which various types of setting operations are carried out such as the running/stopping and the running mode, the temperature setting, and the like of an air conditioner 10, is connected to the air conditioner ECU 450. Air conditioner running based on the operation of the operation panel 456 is carried out at the air conditioner ECU 450.

Further, a compressor motor 458, a servo motor 460, a blower motor 462, a servo motor 464, a servo motor 466, and the like, as well as a cabin temperature sensor 468, a post-evaporator temperature sensor 470, an outside air temperature sensor 472, a solar radiation sensor 474, and the like are connected to the air conditioner ECU 450. The compressor motor 458 drives an unillustrated compressor. The servo motor 460 drives a mode switching damper which switches between an inside air circulating mode and an outside air introducing mode. The blower motor 462 drives a blower fan. The servo motor 464 operates an air mix damper which controls the temperature of the blown-out wind, by controlling the amount of the air conditioned wind which passes through and the amount of air conditioned wind which bypasses a heater core which heats air conditioned wind by the engine cooling water. The servo motor 466 operates a switching damper which switches the blow-out ports through which the air conditioned wind is blown-out. The cabin temperature sensor 468 detects the temperature inside the vehicle cabin.

The post-evaporator temperature sensor 470 detects the temperature of the air conditioned wind which has passed through the evaporator. The outside air temperature sensor 472 detects the outside air temperature. The solar radiation sensor 474 detects the amount of solar radiation.

Here, at the air conditioner ECU 450, on the basis of the detection results of the various types of sensors and the set temperatures, a target blow-out temperature which makes the cabin interior a set temperature is set. In order for the set blow-out temperature to be obtained, the number of rotations of the compressor, the degree of opening of the air mix damper, the amount of wind which is blown-out, and the like are set, and operation of the various devices is controlled on the basis of the set results.

Further, a pressure sensor 476, which detects the pressure of the coolant compressed at the compressor, is provided at the air conditioner 426, and the pressure sensor 476 is connected to the air conditioner ECU 450. At the air conditioner ECU 450, the rotational speed of the compressor motor 458 and the like are controlled such that the coolant pressure detected by the pressure sensor 476 becomes less than or equal to a predetermined value.

In this way, at the air conditioner 10, air conditioning is carried out such that the vehicle cabin interior becomes a set temperature, and, when the vehicle cabin interior reaches the set temperature, air conditioner running is carried out so as to maintain the set temperature. Note that known, general structures can be applied to such operation control of the air conditioner ECU 450.

On the other hand, the cooling device 416 is provided with a cooling controller 478. Note that, hereinafter, description will be given of the cooling controller 478 provided separately from the air conditioner ECU 450 and the engine ECU 452, but the air conditioner ECU 450 or the engine ECU 452 may be made to have the functions of this cooling controller 478.

To the cooling controller 478, the air conditioner ECU 450 and the engine ECU 452 are connected, and the fan motor 438 is connected.

The vehicle speed sensor 454, which detects the traveling speed of the vehicle 410, and a water temperature sensor 480, which detects the temperature of the engine cooling water, are provided at the engine ECU 452. The cooling controller 478 obtains, from the engine ECU 452, the running/stopped state of the engine 14, the traveling speed of the vehicle 410 which is a parameter of the cooling capacity, and the temperature of the engine cooling water which is a parameter of the cooling load on the engine radiator 420. Further, the cooling controller 478 acquires, from the air conditioner ECU 450, the coolant pressure which is a parameter of the cooling load on the condenser 418.

From the temperature of the engine cooling water detected by the water temperature sensor 480, the cooling controller 478 judges the cooling capacity with respect to the cooling load of the engine radiator 420. Further, from the coolant pressure detected by the pressure sensor 476, the cooling controller 478 judges the cooling capacity with respect to the cooling load of the condenser 418.

Moreover, from the traveling speed of the vehicle 410 detected by the vehicle speed sensor 454 and a running/stopped signal of the engine 414 inputted from the engine ECU 452, the cooling controller 478 judges whether or not an increase or decrease in the cooling capacities of the condenser 418 and the engine radiator 420 is possible.

Namely, when the heat generated by the engine 414 is high with respect to the cooling capacity of the engine radiator 420, the water temperature of the engine cooling water rises, and, when the air-cooling load becomes lower than the cooling capacity of the engine radiator 420, the water temperature of the engine cooling water falls. Further, at the air conditioner 426, when the cooling load of the condenser 418 becomes large with respect to the cooling capacity of the condenser 418, the coolant pressure rises.

On the other hand, at the cooling device 416, in the stopped state of the vehicle 410, the fan motor 438 is driven. In this way, the cooling capacities of the condenser 418 and the engine radiator 420 become higher than the non-driven state of the fan motor 438.

Further, at the cooling device 416, a compact electric motor of, for example, 200 w to 300 w is used as the fan motor 438, and the cooling fan 422 is operated at 500 rpm to 800 rpm. In this way, when the vehicle 410 starts traveling forward, when the traveling speed becomes greater than or equal to a predetermined speed (e.g., about 5 km/h), a cooling capacity which is greater than when the fan motor 438 is driven during stoppage is obtained.

Moreover, at the cooling device 416, the engine 414 is driven, and the cooling fan 422 is operated by the driving force of the engine 414. At this time, the cooling fan 422 is operated at a speed of, for example, about 1000 rpm or more, and the cooling capacities of the condenser 418 and the engine radiator 420 become large.

Here, at the cooling controller 478, when the cooling load becomes large with respect to the cooling capacity at either of the condenser 418 or the engine radiator 420, either the fan motor 438 is driven or an engine 414 start request is carried out to the engine ECU 452, so as to make the cooling capacities of the condenser 418 and the engine radiator 420 large.

On the other hand, a temperature sensor 482 is connected to the cooling controller 478. As shown in FIG. 17, the temperature sensor 482 is disposed in a vicinity of the fan coupling 434, and, by detecting the ambient temperature of the fan coupling 434 (atmospheric temperature), detects the temperature of the viscous fluid used in the fan coupling 434.

Generally, the fluidity of the viscous fluid used in the fan coupling 434 becomes high due to the temperature rising. Therefore, when the temperature of the viscous fluid is high, the fluidity becomes high.

Therefore, in a state in which the atmospheric temperature of the fan coupling 434 is high, when the engine 414 which is being driven is stopped, co-rotation arises at the cooling fan 422 and noise is generated.

Thus, at the cooling controller 478, in the state in which the detected temperature of the temperature sensor 482 exceeds a preset temperature, when the engine 414 which is being driven is stopped, the fan motor 438 is driven, and operation of the cooling fan 422 is continued. In this way, cooling of the fan coupling 434 is devised, and co-rotation of the cooling fan is suppressed, and the generation of noise due to co-rotation is prevented.

At the vehicle 410 at which is provided the cooling device 416 which is structured in this way, engine stoppage conditions and engine restart conditions are set in advance. The engine ECU 452 detects the vehicle traveling state and the driving-operating state and the like, and, when the engine stoppage conditions are established, stops the engine 414. Further, in the state in which the engine 414 is stopped, when the engine restart conditions are established, the engine ECU 452 starts the driving of the engine 414.

By the way, at the vehicle 410, due to the engine 414 being driven, the cooling fan 422 is operated by the driving force of the engine 414, and cooling of the condenser 418 and the engine radiator 420 is carried out by the cooling wind which is guided by the cooling fan 422. However, due to the engine 414 stopping and the operation of the cooling fan 422 as well stopping, the cooling capacities of the condenser 418 and the engine radiator 420 also decrease.

Here, when air conditioning of the vehicle cabin interior by the air conditioner 426 is being carried out, when the cooling capacity of the condenser 418 decreases, the air conditioning capacity of the air conditioner 426 also decreases. In this way, the vehicle cabin interior can no longer be maintained in the desired air conditioned state, and the vehicle occupants are made to feel discomfort.

Further, for example, when the engine 414 is stopped after high rotational driving of the engine 414 continues, the operation of the cooling fan 422 also stops. When the cooling capacity of the engine radiator 420 decreases, a rise in temperature of the engine cooling water occurs.

Here, at the cooling device 416, the cooling capacities of the condenser 418 and the engine radiator 420 are controlled on the basis of the cooling loads on the condenser 418 and the engine radiator 420. In this way, efficient cooling using the condenser 418 and the engine radiator 420 is possible.

Figure 19:
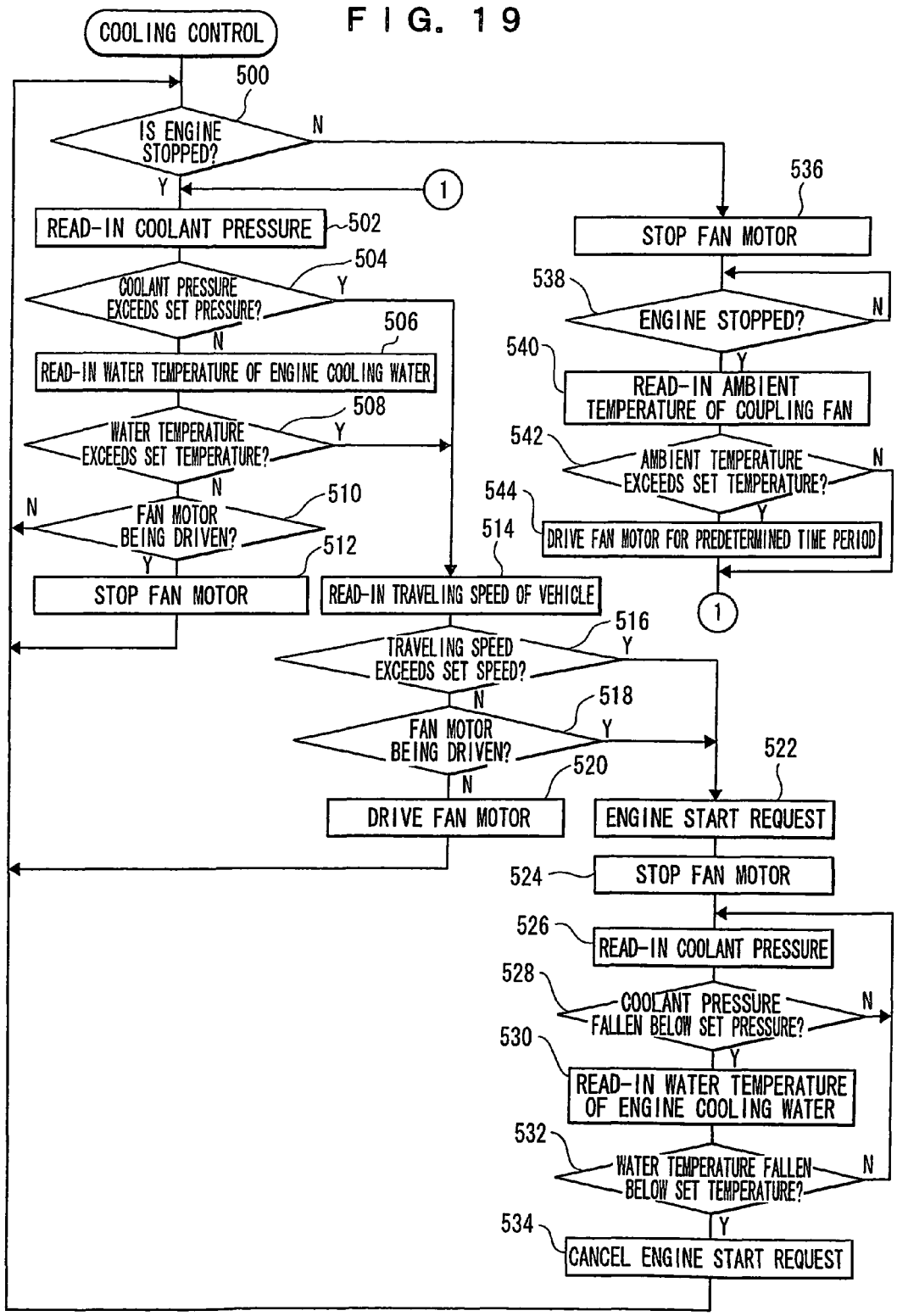
FIG. 19 is a flowchart showing a summary of cooling control relating to the sixth embodiment.

A summary of the cooling control at this time by the cooling controller 478 provided at the cooling device 416 is shown in FIG. 19.

This flowchart is executed due to an unillustrated ignition switch being turned on, and in initial step 500, it is confirmed whether or not the engine 414 is stopped. Here, when the engine stoppage conditions are established and the engine 414 is stopped, the judgment in step 500 is affirmative, and the routine moves on to step 502.

In step 502, coolant pressure Pr detected by the pressure sensor 476 is read-in, and in next step 504, it is confirmed whether or not the coolant pressure Pr exceeds a preset set value (set pressure Ps). Further, in step 506, a water temperature Th of the engine cooling water detected by the water temperature sensor 480 is read-in, and in step 508, it is confirmed whether or not the water temperature Th exceeds a preset set temperature Ths.

Namely, in step 502 and step 504, it is confirmed whether or not the cooling capacity of the condenser 418 has become low with respect to the cooling load of the condenser 418. In step 506 and step 508, it is confirmed whether or not the cooling capacity of the engine radiator 420 has become low with respect to the cooling load of the engine radiator 420.

Here, when the coolant pressure Pr is lower than the set pressure Ps (Pr≦Ps) and the water temperature Th of the engine cooling water is lower than the set temperature Ths (Th≦Ths), the judgments in step 504 and step 508 are negative, and the routine moves on to step 510. Namely, when it is judged that the cooling capacities are high with respect to the respective cooling loads of the condenser 418 and the engine radiator 420, the routine moves on to step 510.

In step 510, it is confirmed whether or not the fan motor 438 is being driven. If the fan motor 438 is being driven, the judgment in step 510 is affirmative, and the routine moves on to step 512 and the fan motor 438 is stopped.

In contrast, when it is judged that the coolant pressure Pr is higher than the set pressure Ps (Pr>Ps) and the cooling load is great with respect to the cooling capacity of the condenser 418 (an affirmative judgment in step 504), or, when it is judged that the water temperature Th of the engine cooling water is higher than the set temperature Ths (Th>Ths) and the cooling load is great with respect to the cooling capacity of the engine radiator 420 (an affirmative judgment in step 508), the routine moves on to step 514.

In step 514, the traveling speed v of the vehicle 410 detected by the vehicle speed sensor 454 is read-in, and in step 516, it is confirmed whether or not the read-in traveling speed v is higher than the preset set speed vs. Further, in step 518, it is confirmed whether or not the fan motor 438 is being driven.

Here, when the vehicle 410 is stopped, or when, even during traveling, the traveling speed v is less than or equal to the set speed vs (v≦vs) and the fan motor 438 also is not being operated, the judgments in step 516 and step 518 are negative, and the routine moves on to step 520 and the fan motor 438 is operated.

Namely, when the vehicle 410 is in a substantially stopped state, if the fan motor 438 is stopped, the fan motor 438 is operated and the cooling capacity is made large by using the fan motor 438.

On the other hand, when the traveling speed v has become higher than the set speed vs (v>vs) or the fan motor 438 is already operating, the judgment in step 516 or step 518 is affirmative, and the routine moves on to step 522.

In step 522, an engine 414 start request is carried out to the engine ECU 452, and in step 524, the fan motor 438 is set in a stopped state. In this way, when the engine ECU 452 restarts the engine 414 on the basis of the engine 414 start request, guiding of cooling wind is carried out by the cooling fan 422 which is operated by the driving force of the engine 414, and the cooling capacities of the condenser 418 and the engine radiator 420 increase.

Thereafter, in step 526, the coolant pressure Pr detected by the pressure sensor 476 is read-in, and it is confirmed whether or not the coolant pressure Pr has become less than the set pressure Ps (step 528). Further, in step 530, the water temperature Th of the engine cooling water detected by the water temperature sensor 480 is read-in, and it is confirmed whether or not the water temperature Th has fallen below the set temperature Ths (step 532).

Here, when the coolant pressure Pr falls below the set pressure Ps (Pr<Ps) and the water temperature Th of the engine cooling water falls below the set temperature Ths (Th<Ths), the judgments in step 528 and step 532 are affirmative, and the routine moves on to step 534 and the engine 414 start request is cancelled.

In this way, at the cooling device 416, it is confirmed whether or not the cooling loads have become great with respect to the respective cooling capacities of the condenser 418 and engine radiator 420. When the cooling loads have become large with respect to the cooling capacities, the cooling capacities of the condenser 418 and the engine radiator 420 are increased in stages.

In this way, appropriate cooling using the condenser 418 and the engine radiator 420 is possible, while suppressing starting of the engine 414 due the cooling capacities becoming low.

On the other hand, when the engine restart conditions are established or an engine 414 start request is made from the cooling controller 478, the engine ECU 452 drives the engine 414.

In above-described step 500, it is confirmed whether or not the engine 414 is stopped. When the engine 414 is started, the judgment in step 500 is negative and the routine moves on to step 536. In this step 536, when the fan motor 438 is being driven, the fan motor 438 is stopped. In next step 538, the engine start request is cancelled, and further, it is confirmed whether or not the engine stoppage conditions are established and the engine 414 is stopped.

Here, when the engine stoppage conditions are established and the engine 414 is stopped, the judgment in step 538 is affirmative, and the routine moves on to step 540. In this step 540, an ambient temperature Tc of the fan coupling 434 detected by the temperature sensor 482 is read-in, and in next step 542, it is confirmed whether or not the ambient temperature Tc exceeds a preset set temperature Tcs.

At this time, if the ambient temperature Tc of the fan coupling 434 exceeds the set temperature Tcs (Tc>Tcs), the judgment in step 542 is affirmative, and the routine moves on to step 544 and the fan motor 438 is driven during a predetermined time period.

In this way, when the engine 414 stops, driving of the fan motor 438 is started, and therefore, the cooling fan 422, which was being operated by the driving force of the engine 414, continues operating uninterruptedly due to the driving force of the fan motor 438. When the engine 414 stops, co-rotation is prevented from arising at the cooling fan 422.

Namely, at the fan coupling 434 in which the viscous fluid is used, due to the ambient temperature rising, the temperature of the viscous fluid also becomes high, and therefore, the fluidity becomes high. At this time, when the engine 414 stops, co-rotation arises at the cooling fan 422, and noise is generated accompanying this co-rotation.

Here, when the engine 414 stops, the fan motor 438 is driven. In this way, the cooling fan 422 does not co-rotate, and rotates due to the driving force of the fan motor 438. Accordingly, the generation of noise due to co-rotation of the cooling fan 422 can be prevented.

Further, at the cooling device 416, even in the vehicle 410 which is provided with the engine 414 which has a large engine capacity, appropriate and efficient cooling using the condenser 418 and the engine radiator 420 is possible by using the fan motor which has a small output.

Seventh Embodiment

A seventh embodiment of the present invention will be described next. Note that the basic structure of the seventh embodiment is the same as the above-described sixth embodiment, and, in the seventh embodiment, the same parts as the sixth embodiment are denoted by the same reference numerals, and description thereof is omitted.

Figure 20:
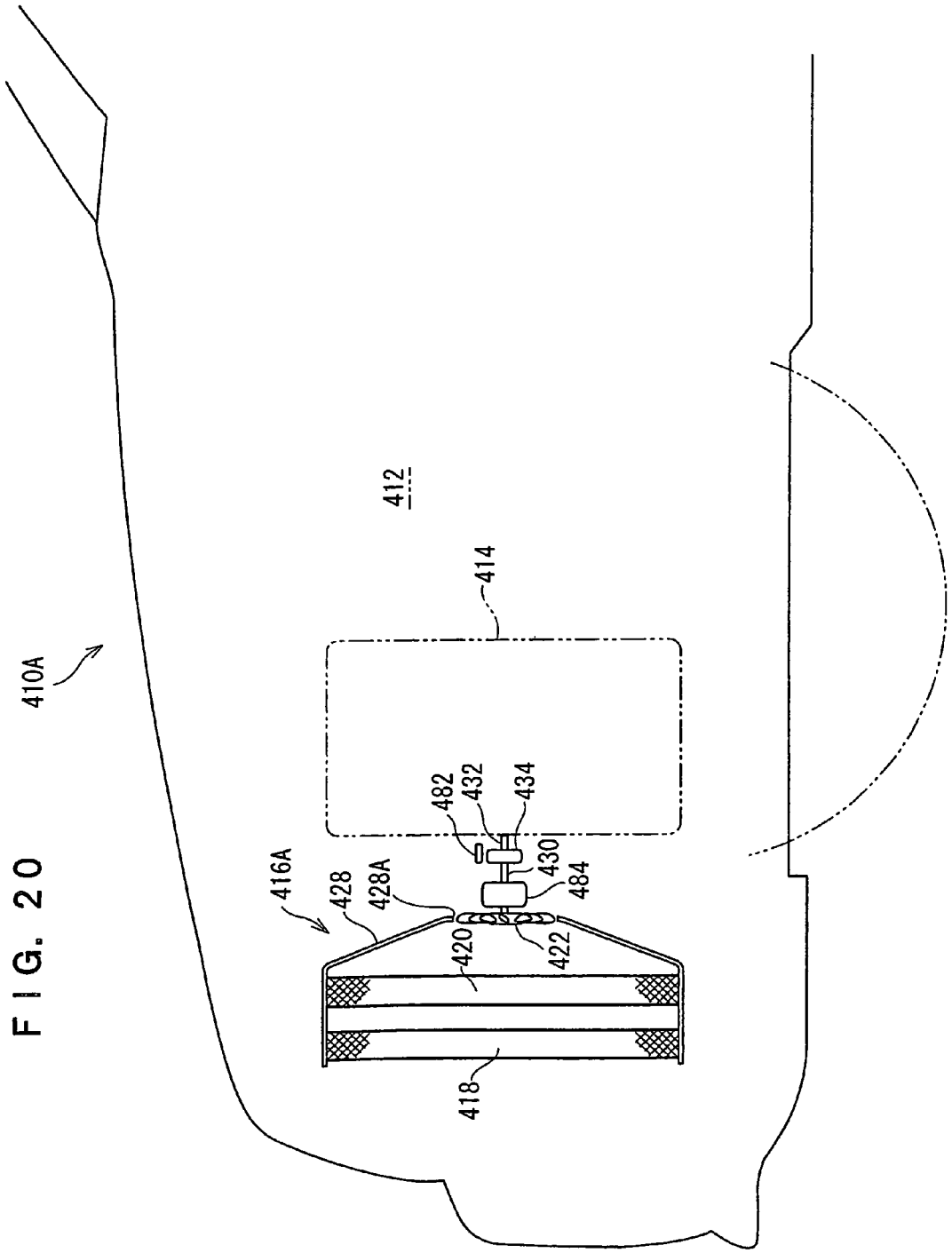
FIG. 20 is a schematic structural drawing of main portions of a vehicle relating to a seventh embodiment.

The schematic structure of main portions of a vehicle 410A relating to the seventh embodiment is shown in FIG. 20. At a cooling device 416A provided within the engine room 412 of the vehicle 410A, a fan motor 484 is provided at the rotating shaft 430 of the cooling fan 422.

Figure 21:
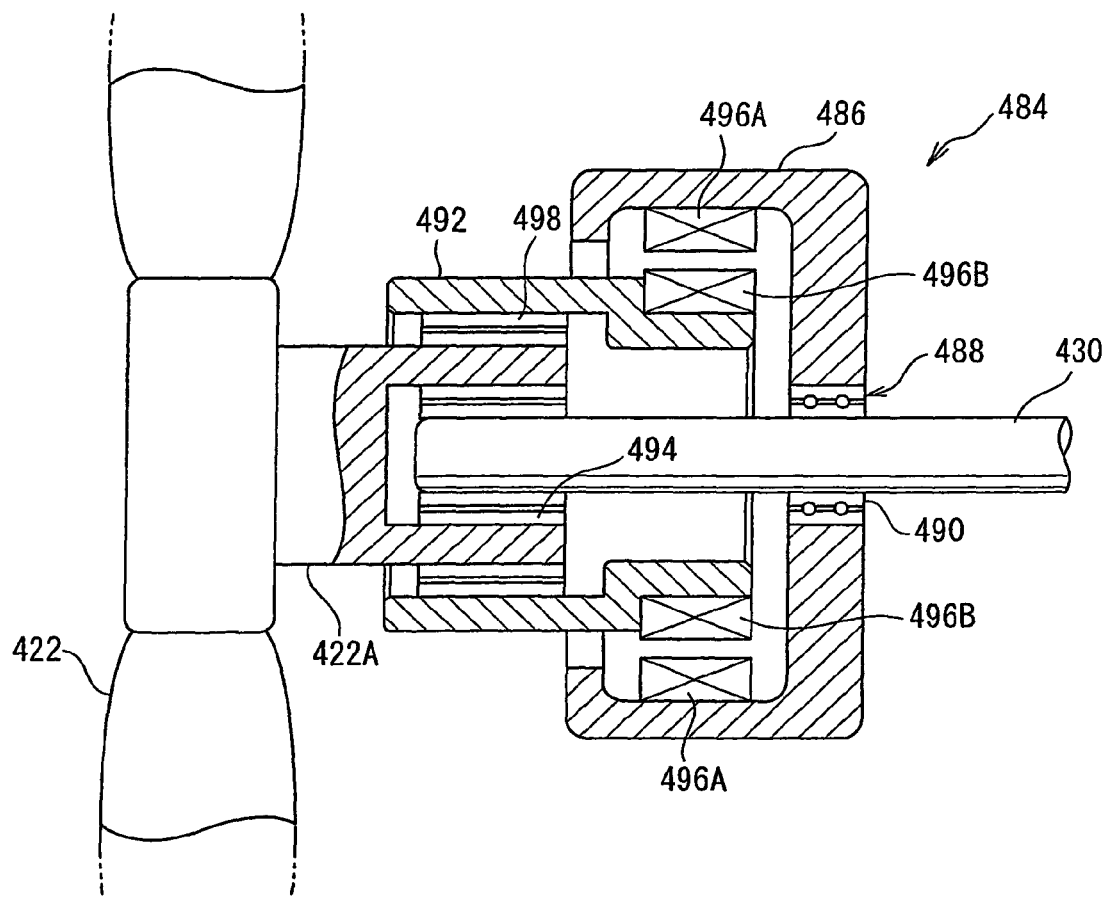
FIG. 21 is a schematic structural drawing of a fan motor relating to the seventh embodiment.

An example of the fan motor 484 is shown in FIG. 21. The fan motor 484 has a housing 486. A bearing portion 488 is provided at the axially central portion of the housing 486. A bearing 490 is provided in the bearing portion 488. The rotating shaft 430 is inserted through the bearing portion 488 and is pivotally supported via the bearing 490. In this way, the rotating shaft 430 can rotate relative to the fan motor 484.

Within the housing 486, a motor drive shaft 492, which is substantially shaped as a cylindrical tube, is disposed between the housing 486 and the rotating shaft 430 which is inserted in the housing 486. Further, a fan rotating shaft 422A of the cooling fan 422 is disposed between the motor drive shaft 492 and the rotating shaft 430. Namely, the rotating shaft 430 is inserted in the motor drive shaft 492, and further, the distal end portion thereof is inserted in the fan rotating shaft 422A.

On the other hand, a one-way clutch 494 is provided between the fan rotating shaft 422A and the rotating shaft 430. When the rotating shaft 430 is rotated due to the driving of the engine 414, the fan-way clutch 494 couples such that the rotating shaft 430 and the fan rotating shaft 422A rotate integrally in a predetermined direction. Further, when the rotation of the rotating shaft 430 stops, the one-way clutch 494 makes it such that the fan rotating shaft 422A can rotate relatively in the aforementioned predetermined direction.

Further, a stator 496A is provided within the housing 486 at the fan motor 484. A rotor 496B, which opposes the stator 496A, is provided at the motor drive shaft 492. In this way, at the fan motor 484, due to electric power of a predetermined voltage being supplied to the fan motor 484 from the cooling controller 478, the motor drive shaft 492 is rotated and driven.

A one-way clutch 498 is provided between the motor drive shaft 492 and the fan rotating shaft 422A. The fan motor 484 rotates and drives the motor drive shaft 492 in the same direction as the rotating shaft 430 which is rotated by the engine 414. At this time, the one-way clutch 498 makes the motor drive shaft 492 and the fan rotating shaft 422A able to rotate integrally.

In this way, when the rotating shaft 430 is rotated by the driving force of the engine 414 in the state in which the fan motor 484 is stopped, the cooling fan 422 rotates integrally with the rotating shaft 430. Further, when the fan motor 484 is driven at the time when rotation of the rotating shaft 430 is stopped, the cooling fan 422 rotates integrally with the motor drive shaft 492.

Cooling control which is similar to the above-described cooling device 416 can be carried out also in the cooling device 416A which uses such a fan motor 484.

Note that the above-described present embodiment does not limit the structure of the present invention. For example, in the present embodiment, a fan motor exclusively used for driving the cooling fan 422 when the cooling fan 422 is driven instead of the engine 414, is provided, but the present invention is not limited to this. For example, the cooling fan 422 may be driven by using the driving force of the compressor motor 458 which is driven when the air conditioner 426 carries out air conditioner running.

At this time, a transfer mechanism such as a driving belt and pulleys or the like, which transfers the rotation of the driving shaft of the compressor motor 458 to the rotating shaft 430, is provided, and an interrupting mechanism such as an electromagnetic clutch or the like is provided within the transfer mechanism, and instead of on/off (running/stopping) of the fan motor 438, on/off of the interrupting mechanism may be carried out.

Further, in the present embodiment, the fan coupling 434 is provided between the rotating shafts 430, 432, but, instead of the fan coupling 434, an electromagnetic clutch which is turned on/off in accordance with the driving/stopping of the engine 414, or the like, may be provided. At this time, driving of the fan motor 438 for preventing co-rotation of the cooling fan 422 when the engine 414 is stopped can be omitted.

Moreover, in the present embodiment, explanation is given by using as examples the vehicles 410, 410A which are hybrid vehicles which carry out automatic idle stop control and economy running control, but the present invention is not limited to this, and can be applied to a vehicle of an arbitrary structure which carries out automatic idle stop control.

The present invention has been described above, but is not limited to the same.

A first aspect of the present invention is a cooling device for a vehicle provided at a vehicle including an engine control unit which stops an engine due to establishment of engine stoppage conditions and restarts the engine due to establishment of engine restart conditions, the cooling device able to cool a coolant within a heat exchanger for cooling by cooling wind, which is guided from an exterior of the vehicle, passing through the heat exchanger for cooling, the cooling device including: a first cooling fan driven by driving force of the engine, and guiding the cooling wind to the heat exchanger for cooling; a second cooling fan driven by an electric motor, and guiding the cooling wind to the heat exchanger for cooling; a selecting unit which can select either one of the first cooling fan or the second cooling fan on the basis of preset conditions and stopping/starting of the engine; and a cooling control unit driving the selected cooling fan when the first or second cooling fan is selected by the selecting unit.

In accordance with the above-described first aspect, the first cooling fan, which is a mechanical fan which is driven by the engine, and the second cooling fan, which is an electric fan which is driven by an electric motor, are provided, and when either one of the first or second cooling fans is selected by the selecting unit, the guiding of cooling wind to the heat exchanger for cooling is carried out by the selected cooling fan.

In this way, for example, also at times when the engine control unit is carrying out idling stop control which stops the engine when traveling of the vehicle is stopped, guiding of cooling wind to the heat exchanger for cooling is possible without driving the engine.

In the above-described first aspect, the selecting unit may select the first cooling fan when the engine is started.

In accordance with this structure, when the engine is started, the first cooling fan is selected. In this way, cooling of the heat exchanger for cooling by the first cooling fan which uses the driving force of the engine is possible.

In the above-described first aspect, when the engine is stopped on the basis of the engine stoppage conditions, the selecting unit may judge, on the basis of a traveling speed of the vehicle, whether or not to select the second cooling fan.

In accordance with this structure, when the engine stoppage conditions are established and the engine is stopped, it is judged, in accordance with the traveling speed of the vehicle, whether or not the second cooling fan is to be selected.

In a hybrid vehicle, due to economy running control being carried out, the engine is stopped, and traveling by the electric motor becomes possible. Further, in the state in which the vehicle is traveling, even in a state in which the first or the second cooling fan is stopped, the cooling wind is guided, and because the traveling speed of the vehicle becomes high, the guided amount of the cooling wind increases.

Accordingly, by selecting the second cooling fan when the traveling speed of the vehicle is lower than the preset speed, efficient cooling of the heat exchanger for cooling is possible.

The above-described first aspect may further include a detecting unit detecting a cooling load of the heat exchanger for cooling, and, when the engine is stopped on the basis of the engine stoppage conditions, the selecting unit may judge, from results of detection of the detecting unit, whether or not to select the second cooling fan.

In accordance with this structure, the cooling load of the heat exchanger for cooling is detected by the detecting unit, and, on the basis of the results of detection, it is judged whether or not the second cooling fan is to be selected to be driven. In this way, accurate cooling of the heat exchanger for cooling by using the second cooling fan is possible.

In the above-described first aspect, the selecting unit may select the second cooling fan when the cooling load detected by the detecting unit exceeds a preset value.

Further, in the above first aspect, when the second cooling fan is selected, when the cooling load detected by the detecting unit exceeds the preset value, the first cooling fan may be selected.

In accordance with this structure, when the cooling load which is detected by the detecting unit exceeds a preset value, the second cooling fan is selected to be driven, and further, when the second cooling fan is selected, if the cooling load exceeds the preset value, the first cooling fan is selected.

In this way, even if it is a vehicle using an engine of a large engine capacity, accurate cooling of the engine radiator, which carries out cooling of the engine cooling water, is possible.

Further, when the condenser provided at an air conditioner device for a vehicle is the heat exchanger for cooling, appropriate cooling of the coolant for air conditioning by using the condenser is possible. Accordingly, it is possible to reliably prevent the cooling capacity of the condenser from decreasing due to the engine stopping, and the comfort within the vehicle cabin from being spoiled.

The detecting unit may be a structure which directly detects the cooling load on the heat exchanger for cooling, or a structure may be applied which detects a relative value of the cooling capacity of the heat exchanger for cooling with respect to the cooling load.

For example, when the heat exchanger for cooling is an engine radiator, a temperature sensor, which detects the temperature of the cooling water which is cooled by the engine radiator (the cooling water temperature), may be used as the detecting unit, and, when the heat exchanger for cooling is a condenser of an air conditioner device, a pressure sensor, which detects the pressure of the coolant which is cooled by the condenser, may be used as the detecting unit.

When the cooling water temperature detected by the temperature sensor has become higher than the preset temperature, and when the coolant pressure detected by the pressure sensor has become higher than the preset pressure, it can be judged that the cooling load has become great with respect to the cooling capacities of the engine radiator and the condenser.

In the above-described first aspect, the engine control unit includes the cooling control unit, and the engine stoppage conditions and the engine restart conditions may include whether or not the first cooling fan is selected.

In accordance with this structure, whether or not the first cooling fan is selected may be an engine stoppage condition and an engine restart condition, and, when the first cooling unit is not selected, it may be such that the engine stoppage conditions can be established, and when the first cooling fan is selected, it may be such that the engine restart conditions are established.

In this way, appropriate cooling of a heat exchanger for cooling, which is based on engine stoppage conditions and engine restart conditions, is possible.

The engine control device to which such an invention is applied is an engine control device which is provided at a vehicle including: a heat exchanger for cooling in which a coolant at an interior is cooled due to cooling wind passing through; a first cooling fan driven by driving force of the engine, and guiding the cooling wind to the heat exchanger for cooling; and a second cooling fan driven by an electric motor, and guiding the cooling wind to the heat exchanger for cooling, and, when preset engine stoppage conditions are established, the engine control device stops the engine, and when engine restart conditions are established, the engine control device restarts the engine which is stopped, the engine control device having: selecting means which can select either one of the first or second cooling fans on the basis of whether or not the engine stoppage conditions and the engine restart conditions are established; and driving control means which, when the selecting means selects the first or second cooling fan, drives that cooling fan.

As described above, in accordance with the first aspect, the excellent effect is obtained that appropriate cooling by a heat exchanger for cooling is possible, while suppressing driving of an engine which is stopped on the basis of engine stoppage conditions.

In particular, because the cooling capacity is increased in stages on the basis of the cooling load on the heat exchanger for cooling, efficient and accurate cooling of the heat exchanger for cooling and engine stopping control are possible.

Moreover, in the above-described first aspect, the first and second cooling fans may be respectively disposed along a vehicle front-rear direction with respect to the heat exchanger for cooling, and the second cooling fan may be disposed at a vehicle front side of the first cooling fan, and there may further be included: a first fan shroud enclosing a periphery of the first cooling fan; a second fan shroud enclosing a periphery of the second cooling fan; first ventilating means formed at the first fan shroud, and impeding passage of the cooling wind through the first fan shroud when the first cooling fan is driven, and allowing passage of the cooling wind through the first fan shroud when the second cooling fan is driven; and second ventilating means formed at the second fan shroud, and impeding passage of the cooling wind through the second fan shroud when the second cooling fan is driven, and allowing passage of the cooling wind through the second fan shroud when the first cooling fan is driven.

In accordance with this structure, the heat exchanger for cooling and the first and second cooling fans are disposed along the front-rear direction of the vehicle. Further, the first and second fan shrouds are provided for the first and second cooling fans respectively, and the air at the periphery is prevented from entering-in into guiding path, and air at the front of the vehicle can be guided as cooling wind toward the rear of the vehicle.

Here, the first ventilating unit is provided at the first fan shroud, and the second ventilating unit is provided at the second fan shroud. When the first cooling fan is driven, the cooling wind passes through the second fan shroud due to the second ventilating unit. When the second cooling fan is driven, the cooling wind passes through the first fan shroud due to the first ventilating unit. Further, the first ventilating unit impedes passage of the cooling wind when the first cooling fan is driven. The second ventilating unit impedes passage of the cooling wind when the second cooling fan is driven.

In this way, when plural cooling fans and fan shrouds which enclose the respective cooling fans are provided, the fan shrouds can be prevented from impeding the guiding of the cooling wind.

Further, because the heat exchanger for cooling and the first and second cooling fans are disposed along the vehicle front-rear direction, cooling wind can be guided to the entire surface of the heat exchanger for cooling. Efficient cooling using the cooling wind is possible.

In this way, in the above-described structure, in an automobile which guides the air at the front of the vehicle as cooling wind from openings of a radiator grill or a bumper grill or the like formed at the vehicle front portion, while hot air within the engine room is prevented from circling-in to the heat exchanger for cooling by the first and second fan shrouds, even in a case in which the second cooling fan is driven for example, the first fan shroud is prevented from impeding the flow of the cooling wind. The cooling wind can be guided smoothly, and efficient cooling of the coolant by the heat exchanger for cooling is devised.

Further, in the above-described structure, the heat exchanger for cooling may include first and second heat exchangers for cooling which respectively cool different coolants and which are arranged in the vehicle front-rear direction.

In accordance with this structure, when the first and second heat exchangers for cooling respectively are to be cooled by the cooling wind, the first and second heat exchangers for cooling are disposed along the vehicle front-rear direction.

In this way, efficient and accurate cooling using the respective heat exchangers for cooling is possible.

Further, in the above-described structure, the second cooling fan and the second fan shroud may be disposed at a rear side, in the vehicle front-rear direction, of the heat exchanger for cooling, and the first cooling fan and the first fan shroud may be disposed at the vehicle rear side of the second cooling fan and the second fan shroud.

The heat exchanger for cooling, the second cooling fan and the second fan shroud, and the first cooling fan and the first fan shroud, are disposed in that order from the vehicle front side.

In this way, when the first cooling fan is driven, the cooling wind which has passed through the heat exchanger for cooling passes through the second fan shroud, and can be sent-out toward the vehicle rear side by the first cooling fan. When the second cooling fan is driven, the cooling wind which has passed through the heat exchanger for cooling is sent-in into the first fan shroud by the second cooling fan, and can be sent-out toward the vehicle rear side.

Further, because air at the vehicle front side (the front side of the heat exchanger for cooling) is sucked-in from the rear side of the heat exchanger for cooling, efficient guiding of the cooling wind is possible when using either of the first or second cooling fans.

Moreover, in the above-described structure, the second cooling fan and the second fan shroud are disposed at the vehicle front side of the heat exchanger for cooling, and the first cooling fan and the first fan shroud may be disposed at a vehicle rear side of the heat exchanger for cooling.

The second cooling fan and the second fan shroud, the heat exchanger for cooling, and the first cooling fan and the first fan shroud are disposed in that order from the vehicle front side.

In this way, when the first cooling fan is driven, the cooling wind, which has passed through the second fan shroud and has been introduced-in and has passed through the heat exchanger for cooling, can be sent-out toward the vehicle rear side by the first cooling fan. When the second cooling fan is driven, the cooling wind, which has been pushed-in to the second fan shroud by the second cooling fan and has passed through the heat exchanger for cooling, can be sent-out toward the vehicle rear side from the first fan shroud. Further, ensuring of the space for providing the first and second cooling fans is easy.

On the other hand, in the above-described structure, the first and second ventilating units may include ventilation openings of the cooling wind, which are formed in the first and second fan shrouds, and blocking members which can open and close the respective ventilation openings.

Ventilation openings are formed in the first and second fan shrouds, and blocking members, which can open and close the respective ventilation openings, are provided.

In this way, due to the ventilation openings being opened by the blocking members, the cooling wind can pass through. Due to the ventilation openings being closed by the blocking members, unnecessary air can be prevented from entering-in, and the cooling wind can be prevented from flowing backward.

In this structure, further, the blocking members may be curtain-like members which are disposed at the vehicle rear sides of the ventilation openings and which can open and close the ventilation openings in accordance with a pressure difference between the vehicle front side and the vehicle rear side of the ventilation openings.

The curtain-like members are disposed at the vehicle rear sides of the ventilation openings. At this time, for example, by fixing or the like the upper ends of the curtain-like members to the peripheral edge portions of the ventilation openings such that they hang down, opening and closing of the ventilation openings by the curtain-like members is possible.

Due to the pressure at the vehicle rear sides of the ventilation openings becoming low, the curtain-like members which are provided in this way open the ventilation openings, and, due to the pressure at the vehicle rear sides of the ventilation openings becoming high, the curtain-like members block the ventilation openings.

In this way, by a simple structure, accurate opening and closing of the ventilation openings is possible from the pressure difference which arises in accordance with the driving of the first or second cooling fan.

Such curtain-like members can be formed by using elastic members, and, in this way, even if there is a slight pressure difference, accurate opening and closing of the ventilation openings is possible.

As described above, in accordance with the above-described structure, the heat exchanger for cooling, and the first and second cooling fans are disposed along the vehicle front-rear direction, and the first and second fan shrouds which enclose the peripheries of the first and second cooling fans are provided, and air at the front of the vehicle is guided to the entire surface of the heat exchanger for cooling by the first or second cooling fan. At this time, by providing the first ventilating unit at the first fan shroud and providing the second ventilating unit at the second fan shroud, smooth guiding of the cooling wind is possible.

In this way, the excellent effect is obtained that efficient and accurate cooling of the heat exchanger for cooling is possible also at times when using either of the first or second cooling fans.

Further, in the above-described structure, as the first and second ventilating units, ventilation openings are formed in the first and second shrouds, and curtain-like members are disposed at the vehicle rear sides of the respective ventilation openings. With this simple structure, accurate opening and closing of the ventilation openings, which corresponds to the driving of the first or second cooling fan, is possible.

A second aspect of the present invention is a cooling device for a vehicle provided at a vehicle at which engine control is carried out which stops an engine due to establishment of preset engine stoppage conditions and restarts the engine due to establishment of engine start conditions, the cooling device including: a heat exchanger for cooling at which heat exchange with a coolant is carried out due to cooling wind being guided; a single cooling fan which, by being rotated and driven, operates and guides the cooling wind to the heat exchanger for cooling; a first driving unit able to operate the cooling fan by driving force of the engine; a second driving unit able to operate the cooling fan by driving force of an electric motor; a detecting unit detecting a cooling load on the heat exchanger for cooling; a judging unit judging a cooling capacity of the heat exchanger for cooling on the basis of results of detection of the detecting unit; and a cooling control unit which, on the basis of results of judgment of the judging unit and a guiding capacity of the cooling wind, selects either one of the first driving unit or the second driving unit and operates the cooling fan.

In accordance with the above-described second aspect, the cooling fan is operated by using the first or second driving unit, and air at the vehicle front side is guided as cooling wind, and cooling of the coolant by using the heat exchanger for cooling is carried out.

Here, the judging unit judges the cooling capacity of the heat exchanger for cooling with respect to the cooling load detected by the detecting unit, and, when it is judged that the cooling capacity is low with respect to the cooling load, the cooling control unit selects either one of the first or second driving unit on the basis of the guiding capacity of the cooling wind, and operates the cooling fan.

In this way, cooling is carried out such that the cooling capacity of the heat exchanger for cooling becomes an appropriate capacity with respect to the cooling load.

In the above-described second aspect, the number of rotations of the cooling fan by the electric motor may be lower than the number of rotations of the cooling fan by the driving force of the engine. Further, the detecting unit may include a water temperature detecting unit, which detects a cooling water temperature of the engine, and a pressure detecting unit, which detects a pressure of the coolant.

Further, the above-described second aspect may further include a speed detecting unit which detects a traveling speed of the vehicle, and, while the cooling fan is being operated by using the second driving unit, or when the traveling speed detected by the speed detecting unit is greater than or equal to a predetermined speed, the cooling control unit may select the first driving unit.

While the cooling fan is being operated by using the second driving unit or when the traveling speed of the vehicle is greater than or equal to a predetermined speed, in a case in which it is judged that the cooling capacity of the heat exchanger for cooling with respect to the cooling load is low, the first driving unit is selected and the cooling fan is operated.

Namely, when the vehicle is stopped, when it is judged that the cooling capacity is low with respect to the cooling load, the second driving unit is selected and the cooling fan is operated. Further, when the cooling fan is being operated by using the second driving unit, or when the traveling speed of the vehicle is greater than or equal to a predetermined speed, the first driving unit is selected and the cooling fan is operated only when it is judged that the cooling capacity with respect to the cooling load is low.

In this way, starting of the engine in order to ensure the cooling capacity can be suppressed. Appropriate cooling using the heat exchanger for cooling can be carried out, without lowering the engine stopping efficiency.

Further, in the above-described second aspect, when the first driving unit may include a fan coupling as a transfer unit which transfers the driving force of the engine to the cooling fan, when an atmospheric temperature of the fan coupling is greater than or equal to a predetermined temperature and the engine stoppage conditions are established, the cooling control unit may select the second driving unit and operate the cooling fan, regardless of the results of judgment of the judging unit.

Generally, a viscous fluid is used in the fan coupling. When the temperature of this viscous fluid is high, when stopping the engine, co-rotation of the cooling fan arises, and noise is generated.

Thus, in accordance with the above-described structure, when the atmospheric temperature of the fan coupling is high, when stopping the engine, the cooling fan is operated by the second driving unit, and operation of the cooling fan is continued.

In this way, co-rotation of the cooling fan is prevented from arising, and the generation of noise can be suppressed.

As described above, in the above-described second aspect, when it is judged that the cooling capacity with respect to the cooling load is low, the first or second driving unit is selected, and the cooling fan is operated. At this time, while the cooling fan is being operated by using the second driving unit, or when the traveling speed of the vehicle is greater than or equal to predetermined, the first driving unit is selected if there is the need to make the cooling capacity large.

In this way, the cooling fan can be operated such that a cooling capacity corresponding to the cooling load is obtained. Accordingly, the excellent effect is obtained that efficient cooling can be carried out without lowering the engine stopping efficiency.

Further, in the above-described second aspect, when stopping the engine, if the atmospheric temperature of the fan coupling is high, the second driving unit is selected and the cooling fan is operated. In this way, the generation of noise due to co-rotation of the cooling fan can be reliably prevented.

What is claimed is:

1. A vehicle cooling device, comprising:
    a heat exchanger which cools coolant by a cooling wind;
    a first cooling fan and a second cooling fan which are respectively disposed along a vehicle front-rear direction with respect to the heat exchanger and which are capable to be rotated and driven respectively by different driving units, the first cooling fan being capable to guide an air at a vehicle front side to a vehicle rear side as the cooling wind by being rotated and driven, and the second cooling fan being disposed at a vehicle front side of the first cooling fan;
    a first fan shroud enclosing a periphery of the first cooling fan;
    a second fan shroud enclosing a periphery of the second cooling fan;
    a first ventilating unit formed at the first fan shroud, and impeding passage of the cooling wind through the first fan shroud when the first cooling fan is driven, and allowing passage of cooling wind through the first fan shroud when the second cooling fan is driven; and
    a second ventilating unit formed at the second fan shroud, and impeding passage of the cooling wind through the second fan shroud when the second cooling fan is driven, and allowing passage of the cooling wind through the second fan shroud when the first cooling fan is driven.

2. The vehicle cooling device of claim 1, wherein the heat exchanger comprises first and second heat exchangers which respectively cool different coolants and which are arranged in the vehicle front-rear direction.

3. The vehicle cooling device of claim 1, wherein the second cooling fan and the second fan shroud are disposed at a rear side, in the vehicle front-rear direction, of the heat exchanger, and the first cooling fan and the first fan shroud are disposed at the vehicle rear side of the second cooling fan and the second fan shroud.

4. The vehicle cooling device of claim 1, wherein the second cooling fan and the second fan shroud are disposed at the vehicle front side of the heat exchanger, and the first cooling fan and the first fan shroud are disposed at a vehicle rear side of the heat exchanger.

5. The vehicle cooling device of claim 1, wherein the first and second ventilating units comprise ventilation openings of the cooling wind which are formed in the first and second fan shrouds, and blocking members which are capable to open and close the respective ventilation openings.

6. The vehicle cooling device of claim 5, wherein the blocking members comprise curtain-like members which are disposed at the vehicle rear sides of the ventilation openings and which are capable to open and close the ventilation openings in accordance with a pressure difference between the vehicle front side and the vehicle rear side of the ventilation openings.

* * * * *